United States Patent
Takahara et al.

(10) Patent No.: US 10,277,139 B2
(45) Date of Patent: Apr. 30, 2019

(54) POWER CONVERSION DEVICE WHICH DETECTS POWER SHORTAGE AND SWITCHES TO A POWER SUPPLY THAT IS CAPABLE OF SUPPLYING POWER

(71) Applicant: Mitsubishi Electric Corporation, Chiyoda-ku (JP)

(72) Inventors: Takaaki Takahara, Chiyoda-ku (JP); Satoshi Murakami, Chiyoda-ku (JP); Ryota Kondo, Chiyoda-ku (JP); Masaki Yamada, Chiyoda-ku (JP); Naohisa Uehara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 190 days.

(21) Appl. No.: 15/122,598

(22) PCT Filed: May 8, 2015

(86) PCT No.: PCT/JP2015/063279
§ 371 (c)(1),
(2) Date: Aug. 30, 2016

(87) PCT Pub. No.: WO2015/174331
PCT Pub. Date: Nov. 19, 2015

(65) Prior Publication Data
US 2017/0070155 A1 Mar. 9, 2017

(30) Foreign Application Priority Data
May 14, 2014 (JP) ................. 2014-100053

(51) Int. Cl.
*H02M 3/00* (2006.01)
*H02M 3/335* (2006.01)
(Continued)

(52) U.S. Cl.
CPC ......... *H02M 3/33576* (2013.01); *H02M 1/14* (2013.01); *H02M 3/33569* (2013.01);
(Continued)

(58) Field of Classification Search
CPC ............ H02M 3/00; H02M 1/00; H02M 7/00; H02M 2001/00; H02J 9/00
(Continued)

(56) References Cited

U.S. PATENT DOCUMENTS 9,806,625 B2 * 10/2017 Takahara ............ H02M 1/4258
2008/0094859 A1 4/2008 Takayanagi et al.
(Continued)

FOREIGN PATENT DOCUMENTS

JP 2008-109754 A 5/2008
JP 4263736 B2 5/2009
(Continued)

OTHER PUBLICATIONS

International Search Report dated Jul. 7, 2015 in PCT/JP2015/063279, filed May 8, 2015.

*Primary Examiner* — Rexford N Barnie
*Assistant Examiner* — Joseph N Inge
(74) *Attorney, Agent, or Firm* — Oblon, McClelland, Maier & Neustadt, L.L.P.

(57) ABSTRACT

A transformer is composed of three or more windings magnetically coupled. An AC/DC converter (2) for converting AC power of an AC power supply (1), a capacitor (3), and a switching circuit (4) are connected to one winding (6a), and a switching circuit (8) or (30) for power conversion of a DC power supply is connected to at least one of the other windings. Voltage of the capacitor (3) or the AC power supply (1) is detected. On the basis of the detected value thereof, the operation state of each switching circuit (4), (8), (30) is determined by an operation state determination circuit (101). On the basis of a result of the determination, the power supply is switched among the AC power supply (1) and the DC power supplies (11) and (34) by an output switch circuit (103).

18 Claims, 32 Drawing Sheets

(51) Int. Cl.
    *H02M 1/14*     (2006.01)
    *H02M 1/00*     (2006.01)
    *H02M 1/10*     (2006.01)
    *H02M 7/06*     (2006.01)
    *H02J 9/00*     (2006.01)

(52) U.S. Cl.
    CPC .......... *H02M 3/33584* (2013.01); *H02J 9/00* (2013.01); *H02M 1/10* (2013.01); *H02M 7/06* (2013.01); *H02M 2001/008* (2013.01); *H02M 2001/0083* (2013.01)

(58) Field of Classification Search
    USPC ......................................................... 307/23
    See application file for complete search history.

(56) References Cited

U.S. PATENT DOCUMENTS

| | | | |
|---|---|---|---|
| 2008/0101096 A1* | 5/2008 | Takayanagi | H02J 7/022 363/17 |
| 2009/0290385 A1* | 11/2009 | Jungreis | H02M 1/4241 363/17 |
| 2016/0204707 A1 | 7/2016 | Takahara et al. | |
| 2016/0233777 A1 | 8/2016 | Murakami et al. | |

FOREIGN PATENT DOCUMENTS

| | | |
|---|---|---|
| WO | WO 2015/059949 A1 | 4/2015 |
| WO | WO 2015/060255 A1 | 4/2015 |

\* cited by examiner

POWER CONVERSION DEVICE WHICH DETECTS POWER SHORTAGE AND SWITCHES TO A POWER SUPPLY THAT IS CAPABLE OF SUPPLYING POWER

TECHNICAL FIELD

The present invention relates to a power conversion device capable of performing power distribution control of input power to multiple outputs, and switching a power supply source in accordance with the state of a load.

BACKGROUND ART

Some conventional power conversion devices use complex windings for a transformer, to obtain a multioutput power supply configuration (for example, see Patent Document 1 below). That is, an object of the conventional-art power conversion device is to, in charging two DC power supplies with power from an AC power supply using a transformer having complex windings magnetically coupled, set a priority on one of the DC power supplies to be charged. In the case where there is no AC power supply, one of the DC power supplies is used as a supply source to charge the other DC power supply by using a bidirectional switch.

CITATION LIST

Patent Document

Patent Document 1: Japanese Patent Publication No.

SUMMARY OF THE INVENTION

Problems to be Solved by the Invention

However, according to the description in the above Patent Document 1, a bidirectional switch circuit for controlling charging is configured with a diode connected in antiparallel to a switching element. Therefore, even if the amount of power received by each DC power supply is to be controlled through PWM by the bidirectional switch circuit, since the power is rectified by the diode connected in a bridge form, the amount of charge to each DC power supply cannot be controlled, resulting in a problem that distribution control for AC input power cannot be performed.

In addition, it is described that a detection unit for detecting whether or not AC input voltage is supplied is provided, and when it is determined from a result of detection by the detection unit that the AC input voltage is not supplied, power is supplied from each DC power supply. However, depending on the power capacity on the AC input side, there is a situation in which power cannot be supplied to a load even though the AC input voltage exists.

The present invention has been made to solve the above problems, and an object of the present invention is to provide a power conversion device in which a plurality of power supplies are connected to a plurality of windings magnetically coupled and which is capable of continuously supplying power by switching the power supply source.

Solution to the Problems

A power conversion device according to the present invention is a power conversion device, wherein a transformer is composed of three or more windings magnetically coupled with each other, an AC/DC converter for converting AC power of an AC power supply to DC, a capacitor for smoothing output voltage of the AC/DC converter, and a switching circuit for converting DC voltage smoothed by the capacitor to AC, are sequentially connected to one of the windings, and a switching circuit for power conversion of a DC power supply is connected to at least one of the others of the windings. The power conversion device includes: a voltage detection unit for detecting voltage of the capacitor; an operation state determination circuit for determining an operation state of each switching circuit on the basis of a detection value from the voltage detection unit; and a power supply switch unit for performing power supply switching between the AC power supply and the DC power supply on the basis of a result of determination by the operation state determination circuit.

Another power conversion device according to the present invention is a power conversion device, wherein a transformer is composed of three or more windings magnetically coupled with each other, an AC/DC converter for converting AC power of an AC power supply to DC, a capacitor for smoothing output voltage of the AC/DC converter, and a switching circuit for converting DC voltage smoothed by the capacitor to AC, are sequentially connected to one of the windings, and a switching circuit for power conversion of a DC power supply is connected to at least one of the others of the windings. The power conversion device includes: a voltage detection unit for detecting voltage of the AC power supply; an operation state determination circuit for determining an operation state of each switching circuit on the basis of a detection value from the voltage detection unit; and a power supply switch unit for performing power supply switching between the AC power supply and the DC power supply on the basis of a result of determination by the operation state determination circuit.

Effect of the Invention

The power conversion device of the present invention enables power to be continuously supplied to a load by detecting power shortage in the power supply with respect to load power and switching the power supply to a power supply that is capable of supplying power.

DESCRIPTION OF EMBODIMENTS

Embodiment 1

Figure 1:
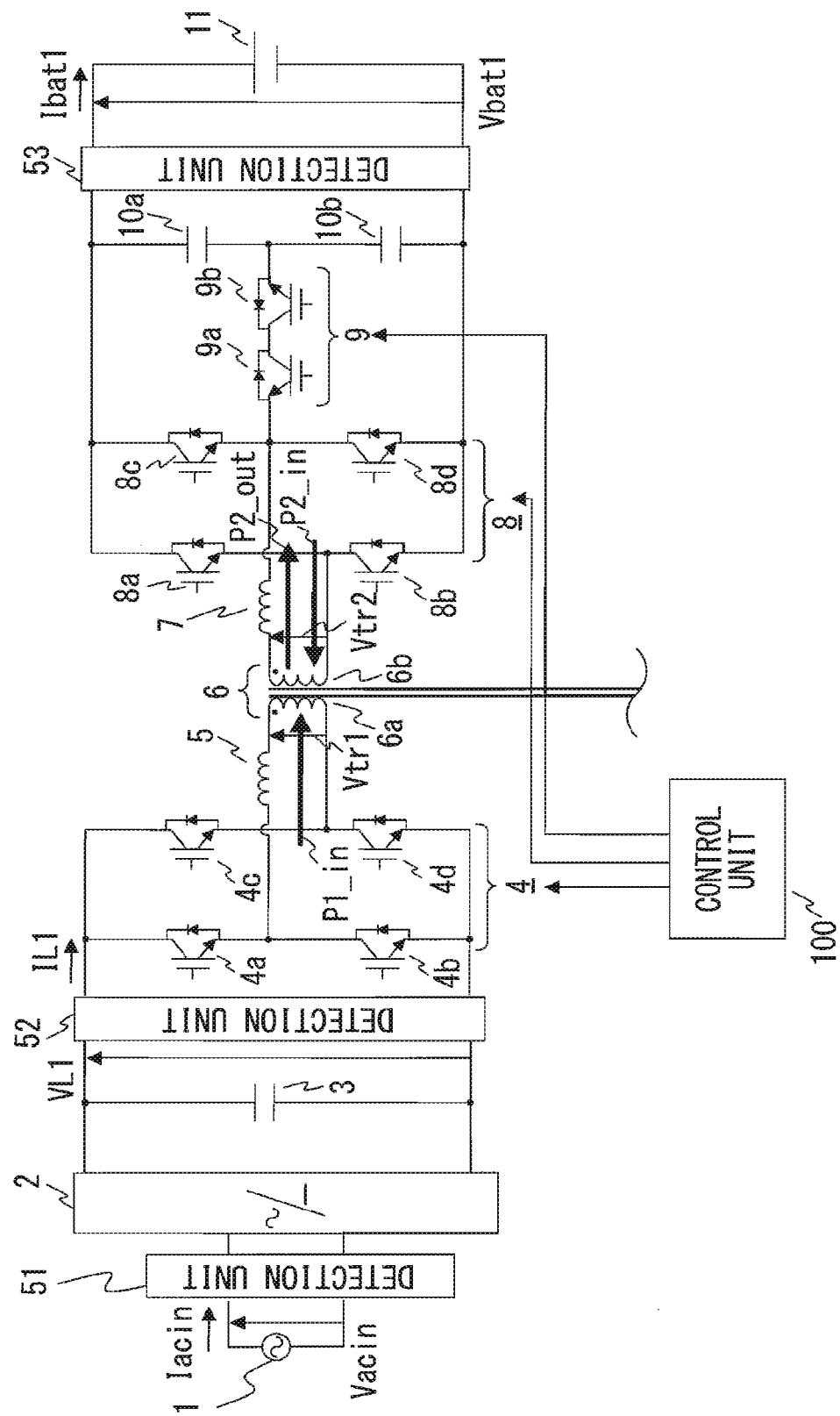
FIG. 1 is a circuit configuration diagram of a power conversion device according to embodiment 1 of the present invention.
Figure 2:
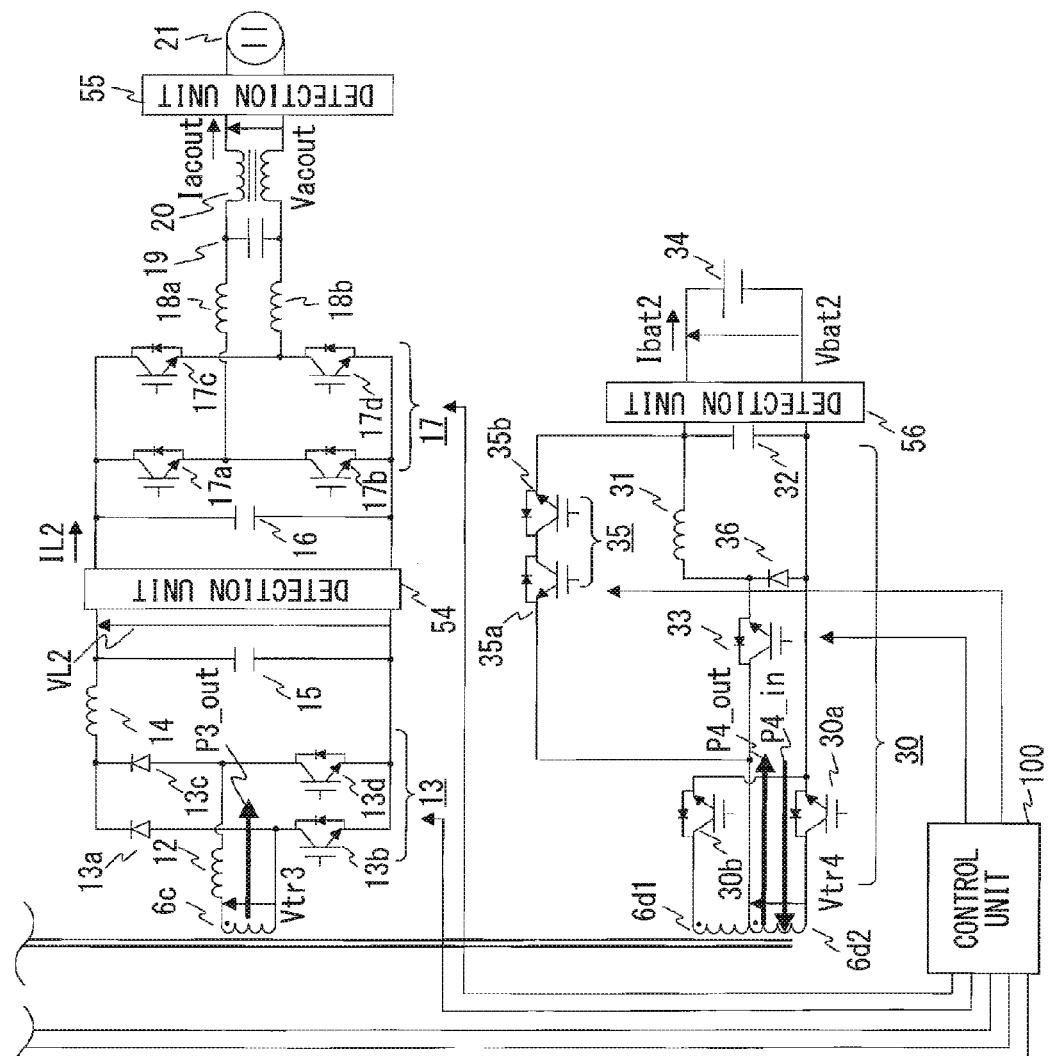
FIG. 2 is a circuit configuration diagram of the power conversion device according to embodiment 1 of the present invention.

FIG. 1 and FIG. 2 are circuit configuration diagrams of a power conversion device according to embodiment 1 of the present invention.

The power conversion device of the present embodiment 1 is applied to, for example, a power supply system involving a charger for an electric vehicle. An AC power supply 1 is a commercial AC power supply, a private power generator, or the like. A first DC power supply 11 is a high-voltage battery for vehicle travelling. A second DC power supply 34 is a battery such as a lead battery which is a power supply for a vehicle electric component. An inverter 17 is used as a power supply of AC 100V which can be used in the vehicle.

The AC power supply 1 is connected to an AC/DC converter 2 via a voltage current detection unit 51. AC voltage Vacin is converted to DC by the AC/DC converter 2 and then stored as DC voltage VL1 in a smoothing capacitor 3. The DC voltage VL1 is converted to AC voltage Vtr1 by a first switching circuit 4. The first switching circuit 4 is formed as an inverter having four switching elements 4a to 4d connected in a bridge form, and controls the power reception amount of input power from the AC power supply 1.

A first end of a step-up coil 5 is connected to a first AC end of the first switching circuit 4, and a first end of a first winding 6a on a primary side of a complex winding transformer (hereinafter, referred to as a transformer) 6 is connected to a second end of the step-up coil 5. A second end of the first winding 6a is connected to a second AC end of the first switching circuit 4.

A first end of a second winding 6b on a secondary side of the transformer 6 is connected to a first end of a step-up coil 7, and a second end of the step-up coil 7 is connected to a first AC end of a second switching circuit 8 and a switch 9 including two switching elements 9a and 9b. A second end of the second winding 6b is connected to a second AC end of the second switching circuit 8. The second switching circuit 8 is composed of four switching elements 8a to 8d connected in a bridge form. When the first DC power supply 11 is to be charged, the switch 9 is turned off and the switching elements 8a to 8d are operated, thereby causing the second switching circuit 8 to function as a full-bridge step-up chopper. When the first DC power supply 11 is to be discharged, the switch 9 is turned on and the switching elements 8a to 8d are operated, thereby causing the second switching circuit 8 to function as a half-bridge inverter.

Output of the switch 9 is connected to a connection point between two capacitors 10a and 10b connected in series. A DC plus terminal of the second switching circuit 8 is connected in common to another end of the capacitor 10a, and connected to a plus end of the first DC power supply 11 via a voltage current detection unit 53. A DC minus terminal of the second switching circuit 8 is connected in common to another end of the capacitor 10b, and connected to a minus end of the first DC power supply 11 via the voltage current detection unit 53. Here, the two capacitors 10a and 10b have the same capacitance.

A first end of a third winding 6c on a tertiary side of the transformer 6 is connected to a first end of a step-up coil 12. A second end of the step-up coil 12 is connected to a first AC end of a third switching circuit 13. A second end of the third winding 6c is connected to a second AC end of the third switching circuit 13. The third switching circuit 13 is formed by connecting, in parallel, a leg composed of a rectification element 13a and a switching element 13b connected in series, and a leg composed of a rectification element 13c and a switching element 13d connected in series. The third switching circuit 13 normally functions as a rectification circuit, and when DC voltage VL2 occurring on a smoothing capacitor 15 described later is lower than a predetermined value, functions as a step-up chopper.

AC voltage Vtr3 occurring on the third winding 6c of the transformer 6 is converted to DC by the third switching circuit 13. The voltage converted to DC by the third switching circuit 13 is smoothed by a smoothing coil 14 and the capacitor 15, and then stored, as DC voltage VL2, in a capacitor 16 via a voltage current detection unit 54. Both terminals of the capacitor 16 are connected to a DC input end of the inverter 17 composed of four switching elements 17a to 17d. An AC output end of the inverter 17 is connected to smoothing coils 18a and 18b, a smoothing capacitor 19, a common mode choke coil 20, a voltage current detection unit 55, and a load device connection end 21, in this order. At the load device connection end 21, AC voltage Vacout is generated which is a power supply for supplying power to various devices connected thereto (not shown) (hereinafter, referred to as an AC load).

Fourth windings 6d1 and 6d2 on a quaternary side of the transformer 6 are configured in a center-tap form. First ends of two switching elements 30a and 30b comprised in a fourth switching circuit 30 are respectively connected to both ends of the fourth windings 6d1 and 6d2. To a connection point as the center tap between the fourth windings 6d1 and 6d2, a switching element 33 is connected and also a switch 35 composed of two switching elements 35a and 35b is connected.

An output side of the switching element 33 is connected to a connection point between a flyback diode 36 and a smoothing coil 31. Output of the smoothing coil 31, output of the switch 35, and a first end of a smoothing capacitor 32 are connected in common, and then connected to a plus end of the second DC power supply 34 via a voltage current detection unit 56. Second ends of the switching elements 30a and 30b are connected to each other, and are connected to an anode end of the flyback diode 36, a second end of the smoothing capacitor 32, and a minus end of the second DC power supply 34. The fourth switching circuit 30 is composed of the two switching elements 30a and 30b, the switching element 33, the flyback diode 36, and the smoothing coil 31. When the second DC power supply 34 is to be charged, the fourth switching circuit 30 is caused to function as a step-down chopper by the configuration of the switching element 33, the flyback diode 36, and the smoothing coil 31. When the second DC power supply 34 is to be discharged, the switch 35 is turned on, whereby the switching element 33, the flyback diode 36, and the smoothing coil 31 are bypassed, and the fourth switching circuit 30 is caused to function as an inverter through operations of the two switching elements 30a and 30b.

Each switching element composing the first to fourth switching circuits 4, 8, 13, and 30, and each switching element composing the inverter 17 may be IGBTs (Insulated Gate Bipolar Transistor), MOSFETs (Metal Oxide Semiconductor Field Effect Transistor), or the like.

A control unit 100 has a function of controlling operations of the first to fourth switching circuits 4, 8, 13, and 30 and the inverter 17.

Next, the summary of power distribution in the power conversion device having the above configuration will be described.

First, the case where the AC power supply 1 is connected and the AC power supply 1 is used as a power supply source, will be described. The voltage Vacin of the AC power supply 1 is converted to the DC voltage VL1 by the AC/DC converter 2, and the DC voltage VL1 is converted to secondary-side DC voltage Vbat1 isolated by the transformer 6, to charge the first DC power supply 11. In addition, the DC voltage VL1 is converted to tertiary-side DC voltage VL2 isolated by the transformer 6, and then, from the DC voltage VL2, AC voltage Vacout for the AC load connected to the load device connection end 21 is generated by the inverter 17. Further, the DC voltage VL1 is converted to quaternary-side DC voltage Vbat2 isolated by the transformer 6, to charge the second DC power supply 34.

Next, the case where the AC power supply 1 is not connected and therefore the first DC power supply 11 is used as a power supply source, will be described. The voltage Vbat1 of the first DC power supply 11 is converted to the tertiary-side DC voltage VL2 isolated by the transformer 6, and then, from the DC voltage VL2, the AC voltage Vacout for the AC load connected to the load device connection end 21 is generated by the inverter 17. In addition, the voltage Vbat1 of the first DC power supply 11 is converted to the quaternary-side DC voltage Vbat2 isolated by the transformer 6, to charge the second DC power supply 34.

Next, the case where the AC power supply 1 is not connected and the second DC power supply 34 is used as a power supply source because the charge amount of the first DC power supply 11 is insufficient, will be described. The voltage Vbat2 of the second DC power supply 34 is converted to the tertiary-side DC voltage VL2 isolated by the transformer 6, and then, from the DC voltage VL2, the AC voltage Vacout for the AC load connected to the load device connection end 21 is generated by the inverter 17. In addition, the voltage Vbat2 of the second DC power supply 34 is converted to the secondary-side DC voltage Vbat1 isolated by the transformer 6, to charge the first DC power supply 11.

Arrows shown in FIG. 1 and FIG. 2 define power directions in the power conversion device according to embodiment 1 of the present invention.

Here, power supplied from the AC power supply 1 through the AC/DC converter 2 and the first switching circuit 4 to the first winding 6a on the primary side of the transformer is denoted by P1_in. Power supplied from the second winding 6b on the secondary side of the transformer through the second switching circuit 8 to the first DC power supply 11 is denoted by P2_out. Power supplied from the first DC power supply 11 through the second switching circuit 8 to the second winding 6b on the secondary side of the transformer is denoted by P2_in.

Power supplied from the third winding 6c on the tertiary side of the transformer through the third switching circuit 13 and the inverter 17 to the AC load connected to the load device connection end 21 is denoted by P3_out. Power supplied from the fourth windings 6d1 and 6d2 on the quaternary side of the transformer through the fourth switching circuit 30 to the second DC power supply 34 is denoted by P4_out. Power supplied from the second DC power supply 34 through the switching elements 30a and 30b to the fourth windings 6d1 and 6d2 on the quaternary side of the transformer is denoted by P4_in.

As the operation state of the power conversion device in embodiment 1 shown in FIG. 1 and FIG. 2, there are four operation states [1-A to 1-D] shown in FIG. 3 to FIG. 10. These four operation states will be described.

Figure 3:
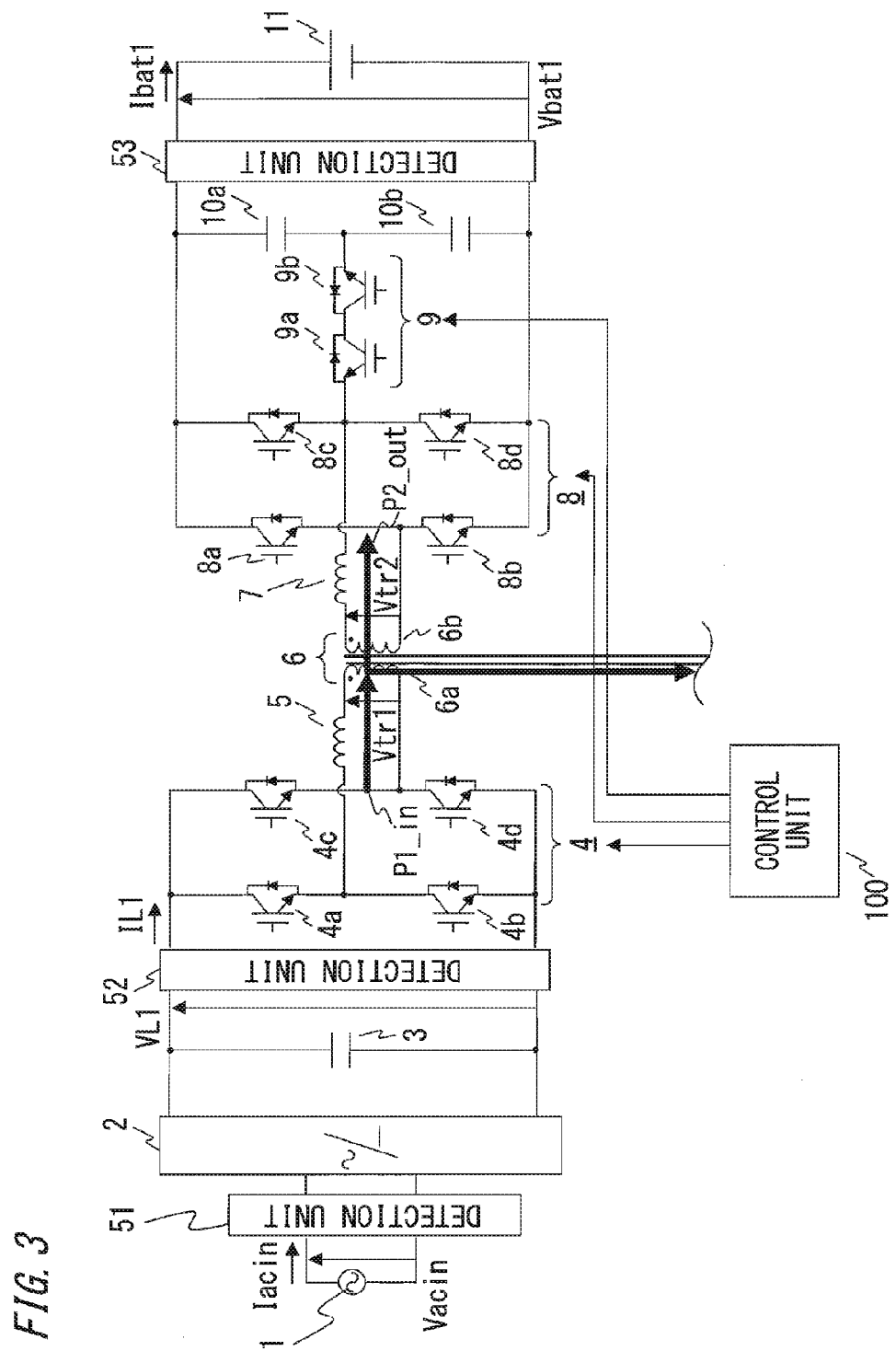
FIG. 3 is an explanation diagram of power flow in an operation state 1-A of the power conversion device according to embodiment 1 of the present invention.
Figure 4:
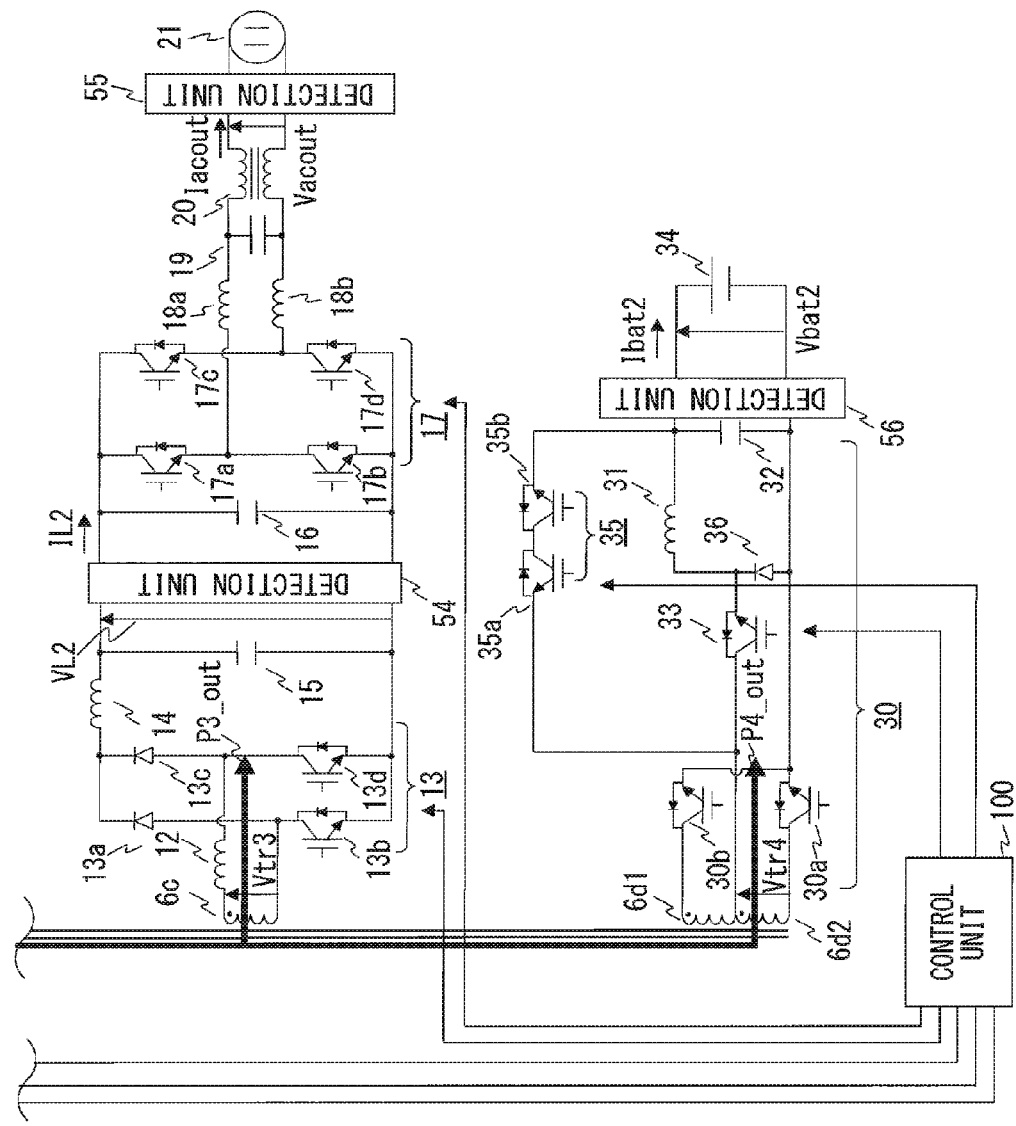
FIG. 4 is an explanation diagram of power flow in the operation state 1-A of the power conversion device according to embodiment 1 of the present invention.

FIG. 3 and FIG. 4 show power flow in the operation state 1-A. This is the case where the AC power supply 1 is connected and the AC power supply 1 is used as a power supply source. In this case, the input power P1_in from the AC power supply 1 is distributed into charge power P2_out for the first DC power supply 11, supply power P3_out for the AC load connected to the load device connection end 21, and charge power P4_out for the second DC power supply 34.

Figure 5:
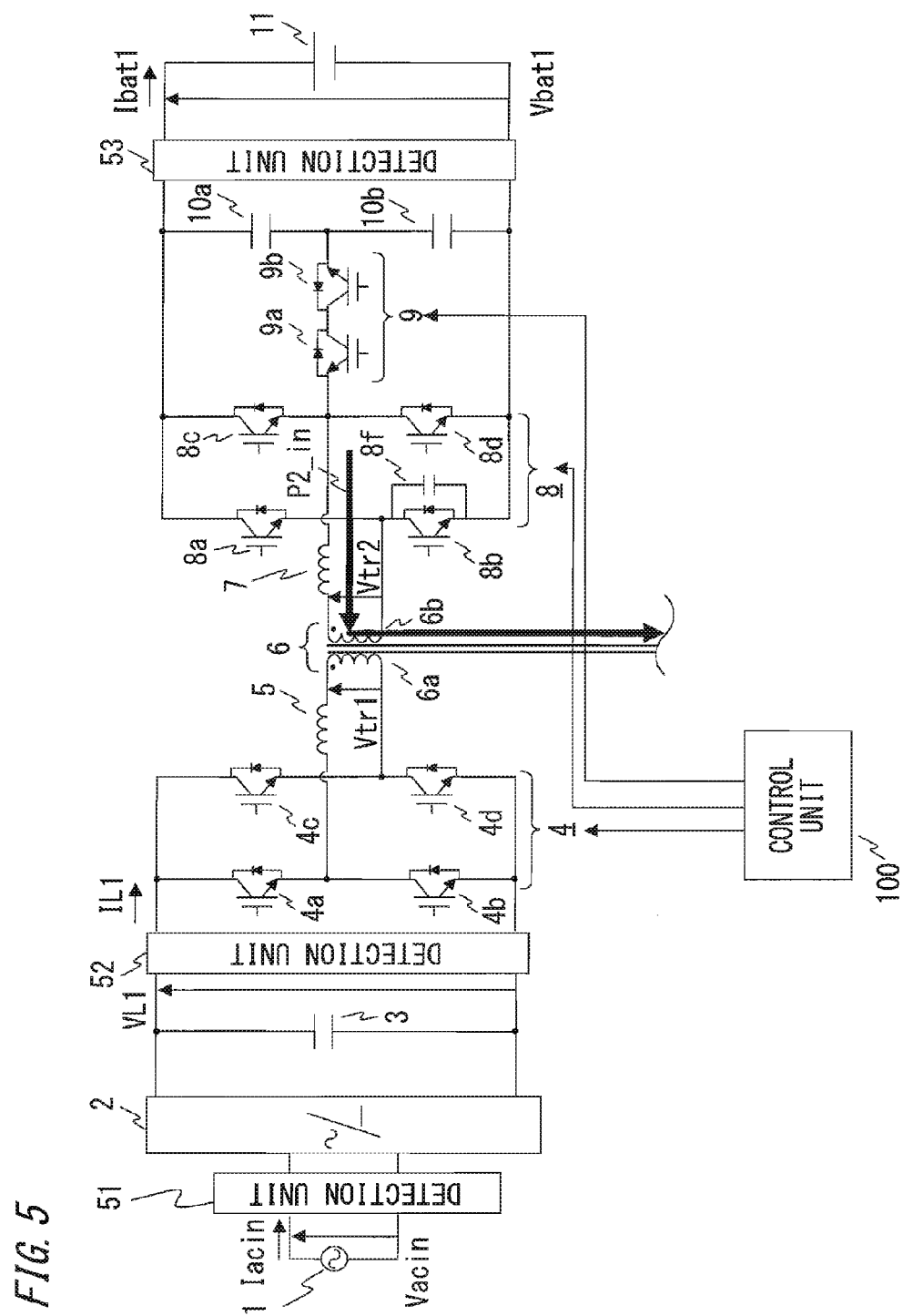
FIG. 5 is an explanation diagram of power flow in an operation state 1-B of the power conversion device according to embodiment 1 of the present invention.
Figure 6:
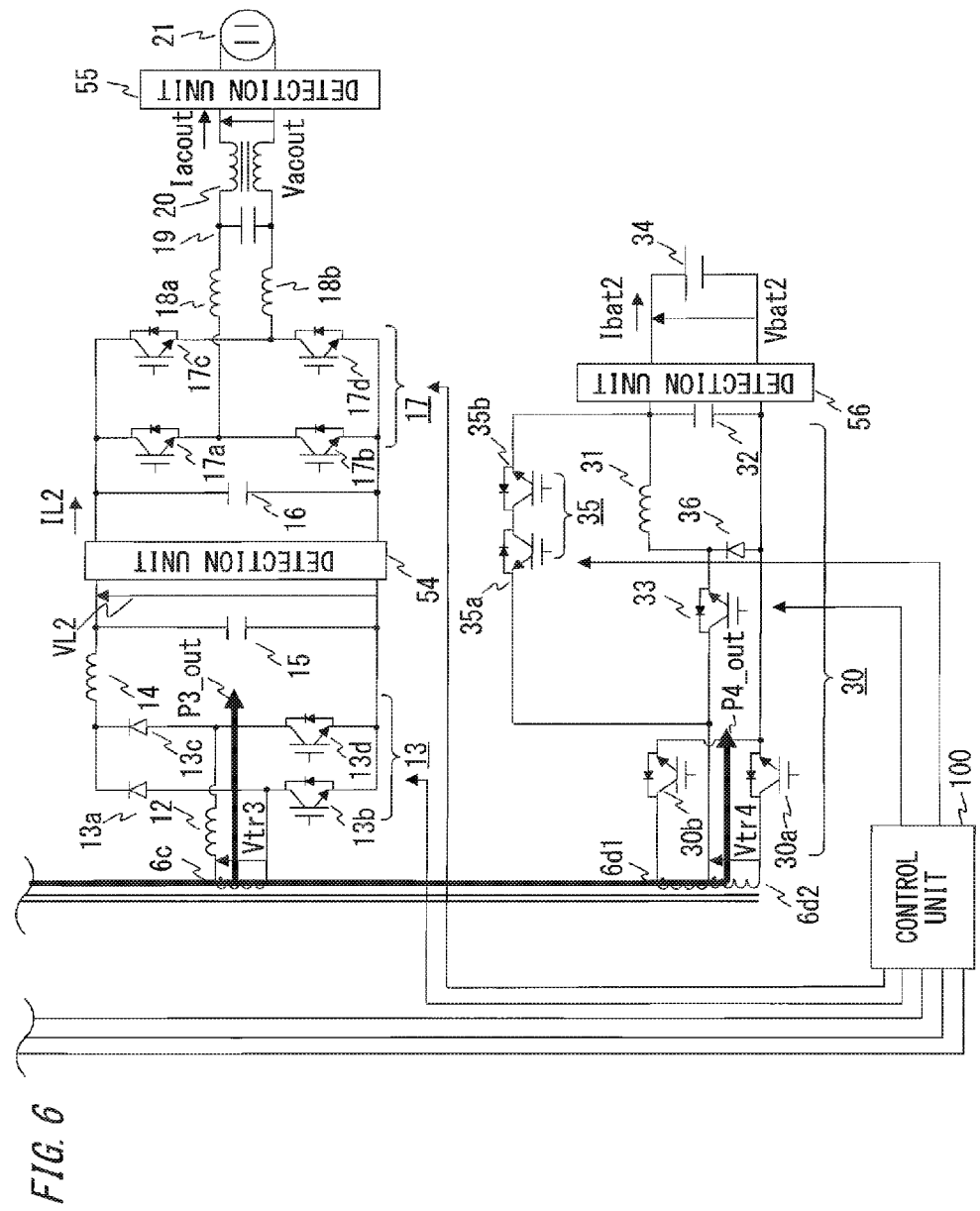
FIG. 6 is an explanation diagram of power flow in the operation state 1-B of the power conversion device according to embodiment 1 of the present invention.

FIG. 5 and FIG. 6 show power flow in the operation state 1-B. This is the case where, for such a reason that the AC power supply 1 is not connected, there is no input power P1_in from the AC power supply 1, and the first DC power supply 11 is used as a power supply source. In this case, discharge power P2_in from the first DC power supply 11 is distributed into supply power P3_out for the AC load connected to the load device connection end 21, and charge power P4_out for the second DC power supply 34.

Figure 7:
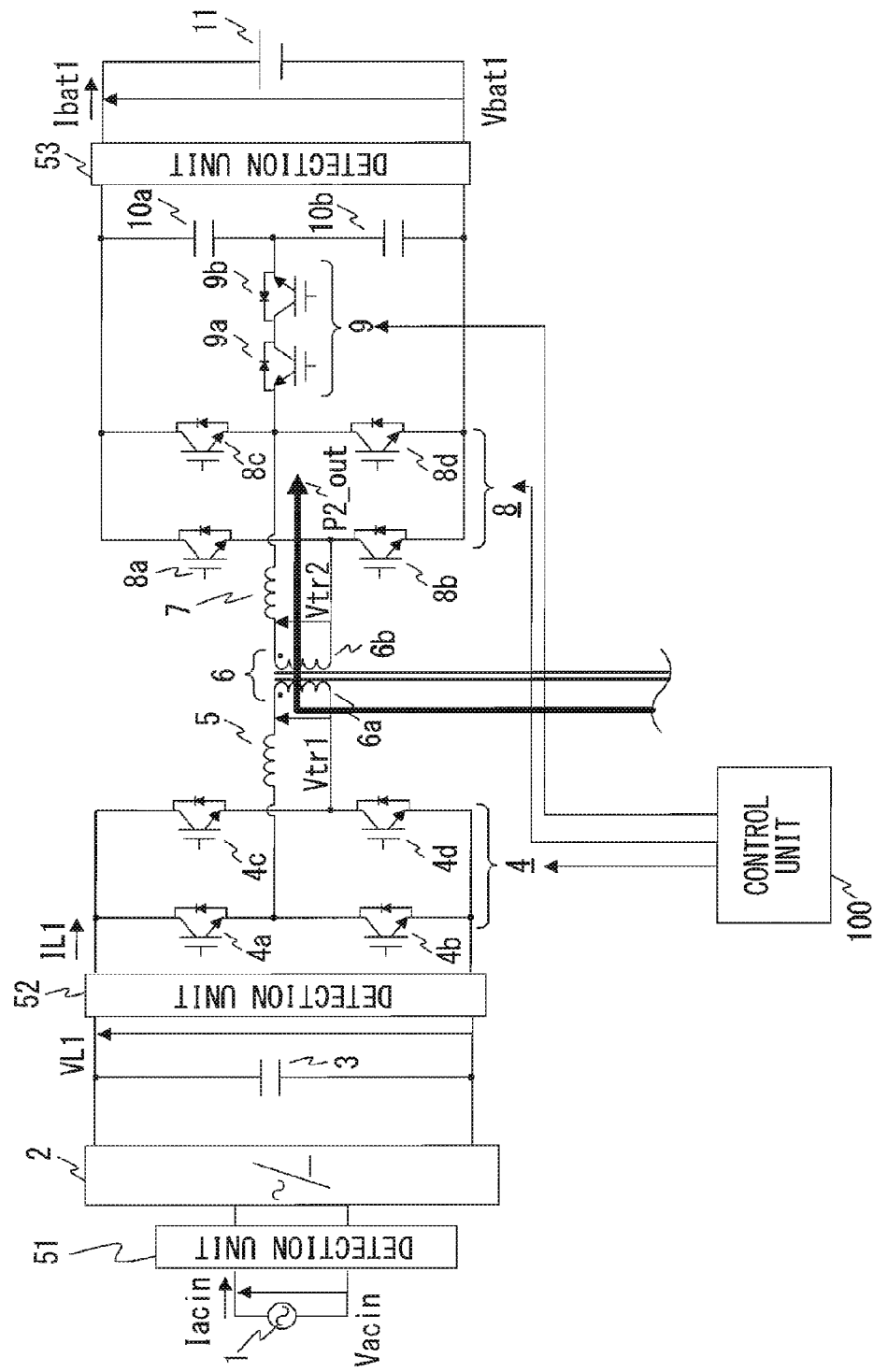
FIG. 7 is an explanation diagram of power flow in an operation state 1-C of the power conversion device according to embodiment 1 of the present invention.
Figure 8:
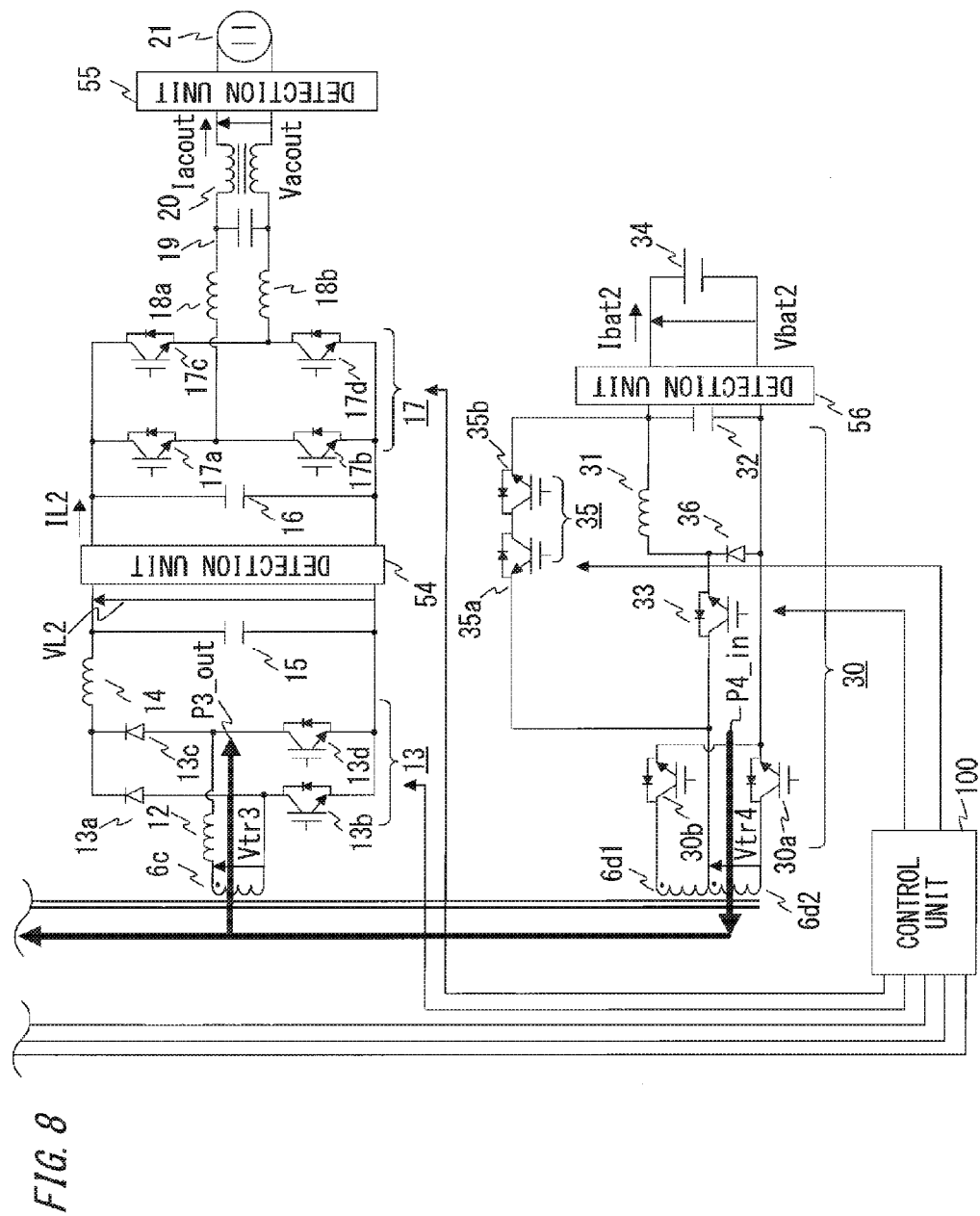
FIG. 8 is an explanation diagram of power flow in the operation state 1-C of the power conversion device according to embodiment 1 of the present invention.

FIG. 7 and FIG. 8 show power flow in the operation state 1-C. This is the case where, as in the case of FIG. 5 and FIG. 6, for such a reason that the AC power supply 1 is not connected, there is no input power P1_in from the AC power supply 1, and since the charge power in the first DC power supply 11 is insufficient, the second DC power supply 34 is used as a power supply source. In this case, discharge power P4_in from the second DC power supply 34 is distributed into charge power P2_out for the first DC power supply 11 and supply power P3_out for the AC load connected to the load device connection end 21.

In FIG. 3 to FIG. 8, the case where all the power reception parts other than a part serving as a power supply source are regarded as loads and power is supplied to these loads, has been described, but the case where power supplied to one of the loads is set to zero is also included. For example, in FIG. 3 and FIG. 4, supply power P2_out for the first DC power supply 11 may be set to zero, or supply power P2_out for the first DC power supply 11 and supply power P3_out for the AC load connected to the load device connection end 21 may both be set to zero.

Figure 9:
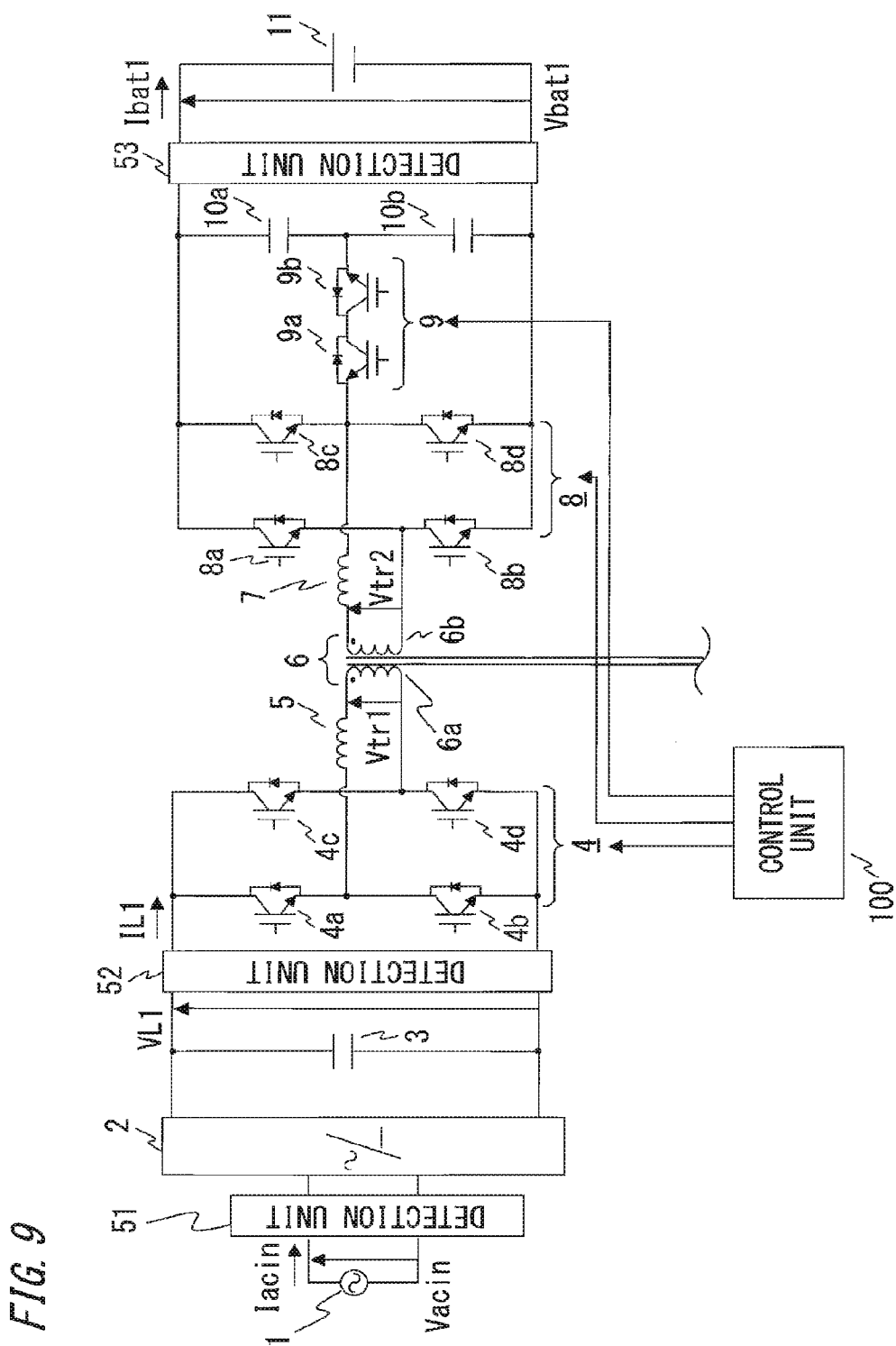
FIG. 9 is an explanation diagram of power flow in an operation state 1-D of the power conversion device according to embodiment 1 of the present invention.
Figure 10:
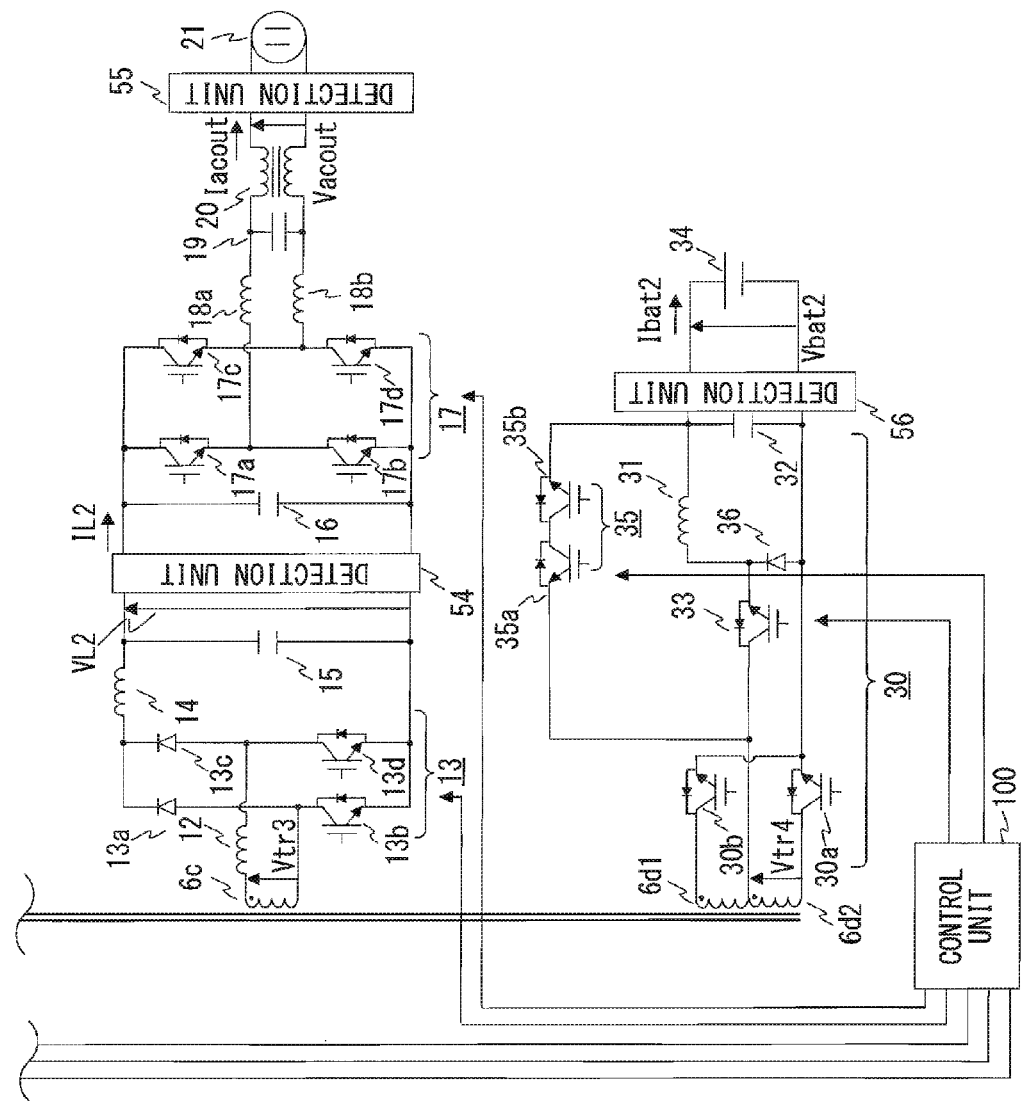
FIG. 10 is an explanation diagram of power flow in the operation state 1-D of the power conversion device according to embodiment 1 of the present invention.

FIG. 9 and FIG. 10 show power flow in the operation state 1-D. This is the case where there is no input power P1_in from the AC power supply 1, and charge powers in the first DC power supply 11 and the second DC power supply 34 are both insufficient so that discharge cannot be performed, or the case where power is supplied to none of the first DC power supply 11, the AC load connected to the load device connection end 21, and the second DC power supply 34. In this case, the power conversion device stops all the operations, and all the power flows become zero.

Figure 11:
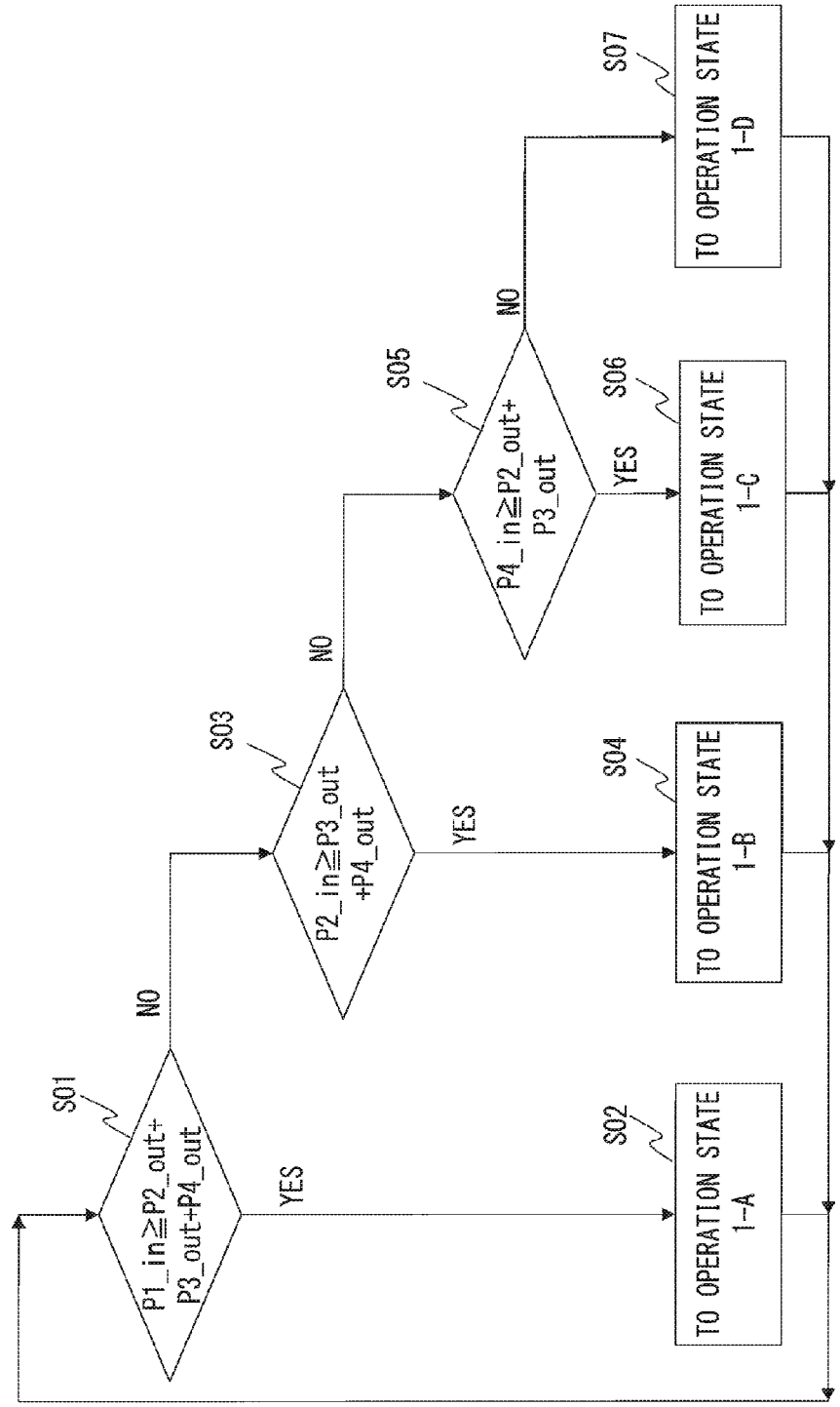
FIG. 11 is an explanation diagram of a flowchart of operation state switch control according to embodiment 1 of the present invention.

FIG. 11 shows a flowchart of operation state switch control.

First, in step S01, it is determined whether total power of charge power P2_out for the first DC power supply 11, supply power P3_out for the AC load connected to the load device connection end 21, and charge power P4_out for the second DC power supply 34, as loads, can be covered by input power P1_in from the AC power supply 1. If it is determined that the total power can be covered in step S01 (YES), the process shifts to step S02 and the operation state is determined to be the operation state 1-A.

If it is determined that the total power cannot be covered in step S01 (NO), the process shifts to step S03. In step S03, supply of power from the AC power supply 1 is stopped, the first DC power supply 11 is used as a power supply source, and it is determined whether total power of supply power P3_out for the AC load connected to the load device connection end 21 and charge power P4_out for the second DC power supply 34, as loads, can be covered by input power P2_in from the first DC power supply 11. If it is determined that the total power can be covered in step S03 (YES), the process shifts to step S04 and the operation state is determined to be the operation state 1-B.

If it is determined that the total power cannot be covered in step S03 (NO), the process shifts to step S05. In step S05, supply of power from the first DC power supply 11 is stopped, the second DC power supply 34 is used as a power supply source, and it is determined whether total power of charge power P2_out for the first DC power supply 11 and supply power P3_out for the AC load connected to the load device connection end 21, as loads, can be covered by input power P4_in from the second DC power supply 34. If it is determined that the total power can be covered in step S05 (YES), the process shifts to step S06 and the operation state is determined to be the operation state 1-C. On the other hand, if it is determined that the total power cannot be covered in step S05 (NO), the process shifts to step S07 and the operation state is determined to be the operation state 1-D.

As is found from the flowchart shown in FIG. 11, when operation is performed in the operation state 1-A, if input power from the AC power supply 1 decreases or if power supplied to one of the loads increases and power supplied to the loads exceeds the input power from the AC power supply 1, supply of power from the AC power supply 1 is stopped and discharge from the first DC power supply 11 is prioritized. At this time, if the first DC power supply 11 has been charged, the operation state can be switched to the operation state 1-B.

Even in the case where the first DC power supply 11 has not been charged, if the second DC power supply 34 has been charged, the operation state can be switched to the operation state 1-C. If both the first DC power supply 11 and the second DC power supply 34 have not been charged, the operation state can be switched to the operation state 1-D which is a stopped state.

When operation is performed in the operation state 1-B, if the AC power supply 1 is connected or if power supplied to the loads decreases, the operation state can be switched to the operation state 1-A. If discharge power from the first DC power supply 11 decreases, the operation state can be switched to the operation state 1-C.

When operation is performed in the operation state 1-C, if the AC power supply 1 is connected or if power supplied to the loads decreases, the operation state can be switched to the operation state 1-A. If discharge power from the second DC power supply 34 decreases, the operation state can be switched to the operation state 1-D.

In the flowchart shown in FIG. 11, step S01 is set as the determination at the uppermost stage so that power from the AC power supply 1 can be preferentially used. However, without limitation thereto, if it is desired to prioritize discharge from the first or second DC power supply 11 or 34, step S03 or step S05 may be set as the determination at the uppermost stage. Alternatively, step S05 may be set as the determination at the stage subsequent to step S01, and step S03 may be set as the determination at the stage subsequent to step S05.

Figure 12:
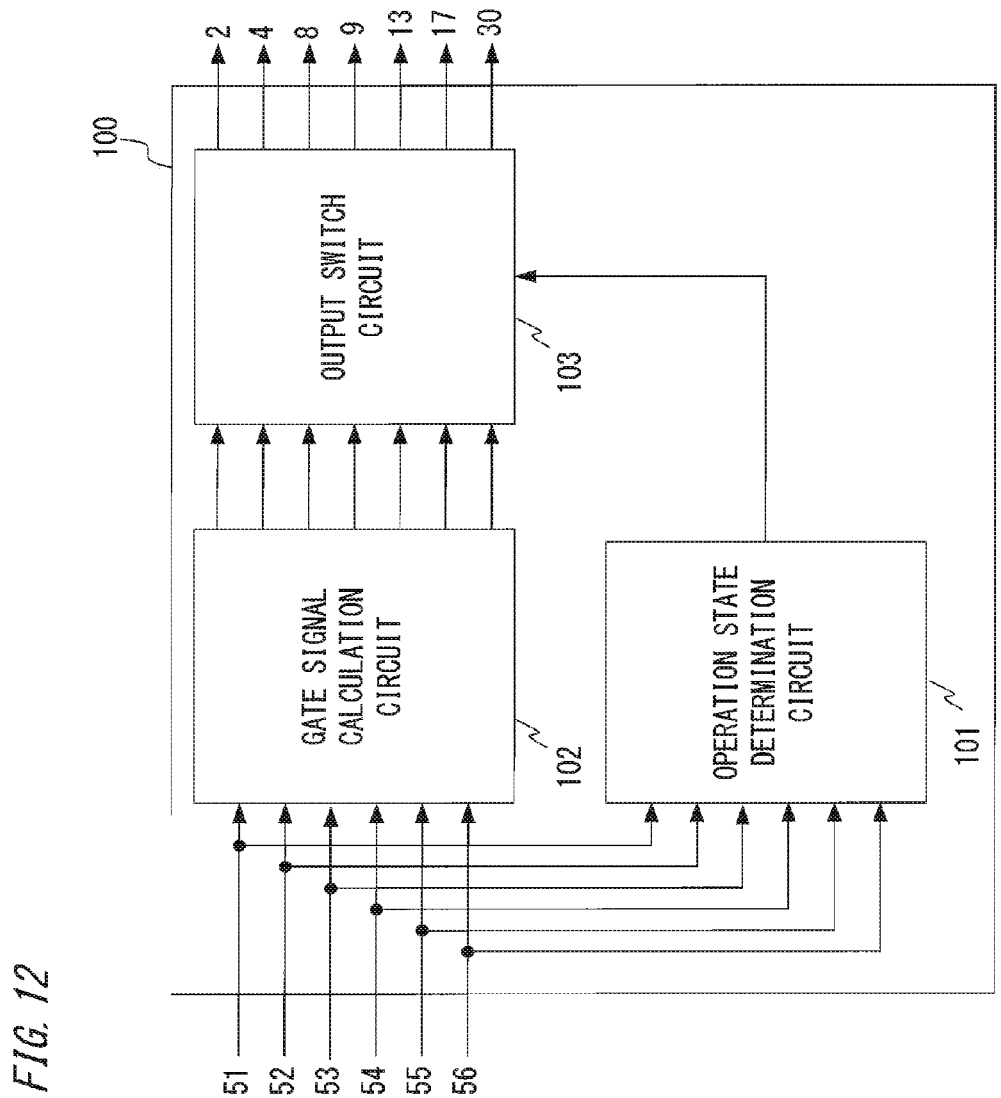
FIG. 12 is a block diagram showing the configuration of a control unit of the power conversion device according to embodiment 1 of the present invention.

FIG. 12 shows a configuration diagram of the control unit 100 for executing the operation state switch control flow shown in FIG. 11.

The control unit 100 includes a gate signal calculation circuit 102 for controlling the AC/DC converter 2, the first to fourth switching circuits 4, 8, 13, 30, the switch 9, and the inverter 17. The gate signal calculation circuit 102 calculates gate signals on the basis of detection signals from voltage current detection units 51 to 56. An operation state determination circuit 101 performs determination as to the operation states of the AC/DC converter 2, the first to fourth switching circuits 4, 8, 13, 30, the switch 9, and the inverter 17 on the basis of the detection signals from the voltage current detection units 51 to 56, and calculates an operation state determination signal indicating a result of the determination. On the basis of the operation state determination signal from the operation state determination circuit 101, an output switch circuit 103 selects and outputs gate signals corresponding to the operation state among the gate signals from the gate signal calculation circuit 102. However, voltage current detection signals that are not used for calculation of the gate signals or determination as to the operation state may not be inputted to the control unit 100.

The voltage current detection unit 51 corresponds to a voltage detection unit for detecting voltage of the AC power supply 1 in claims. The voltage current detection unit 52 corresponds to a voltage detection unit for detecting voltage of the capacitor 3 in claims. The output switch circuit 103 corresponds to a power supply switch unit in claims.

Figure 13:
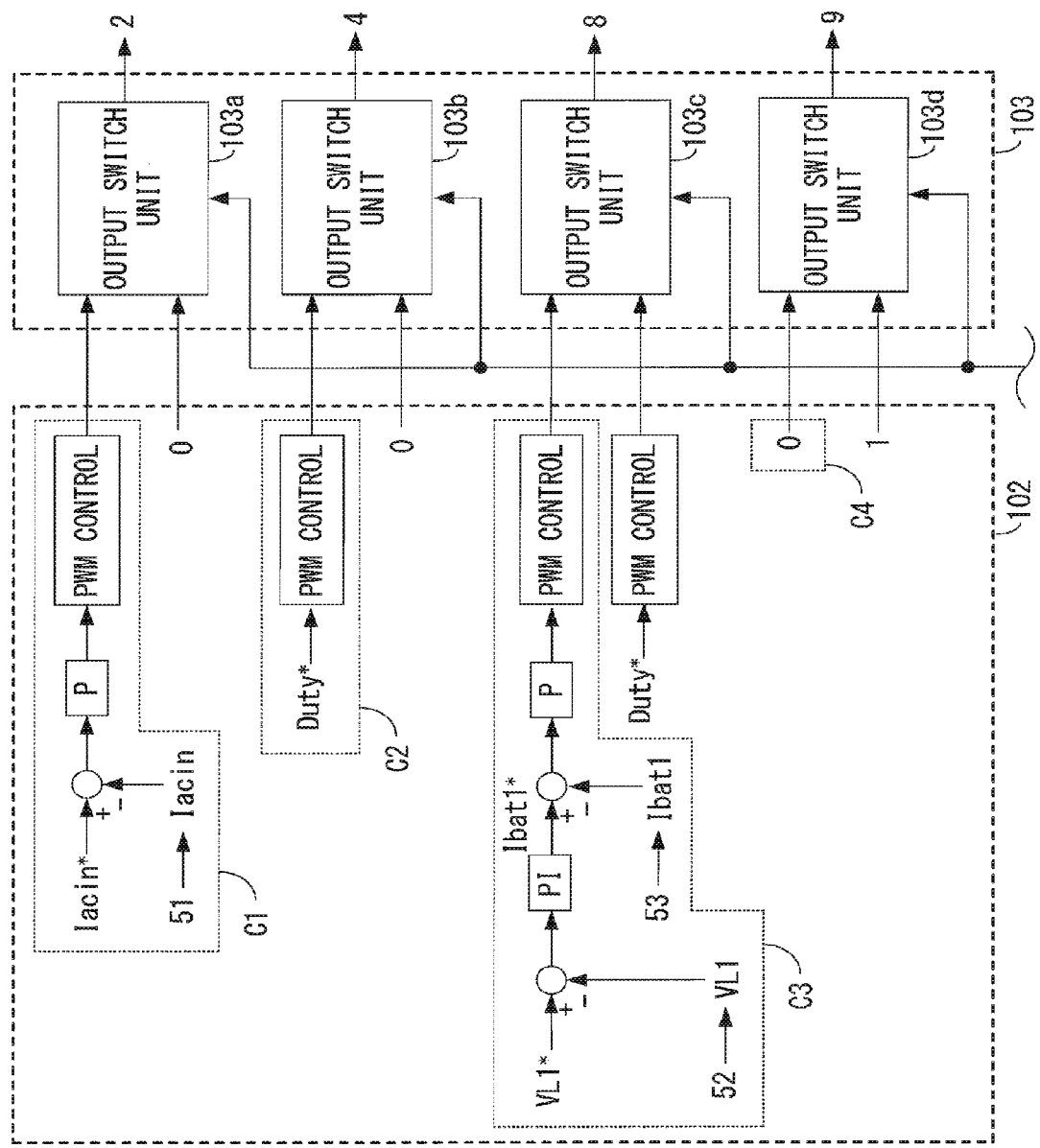
FIG. 13 is a block diagram showing the details of the configuration of the control unit shown in FIG. 12.
Figure 14:
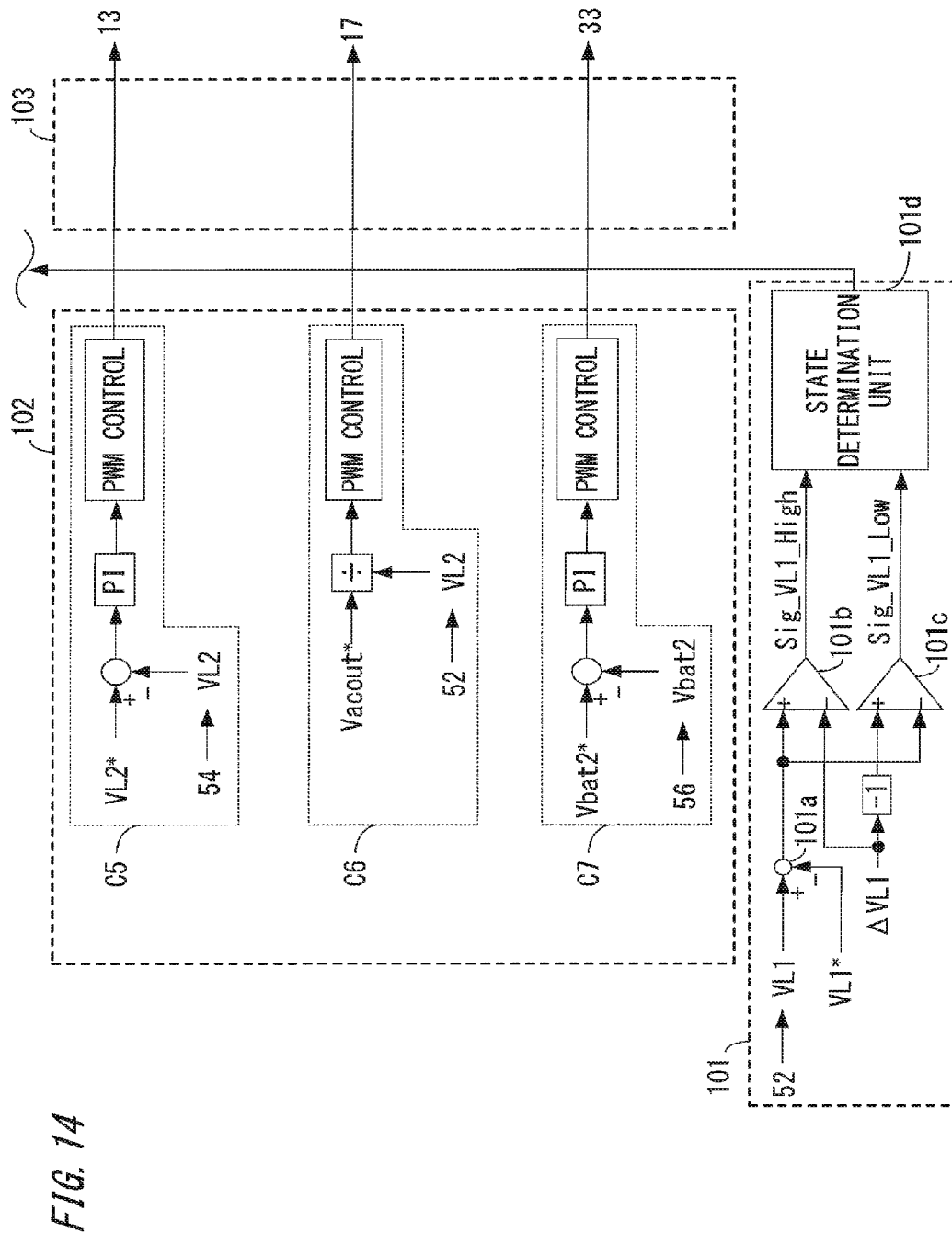
FIG. 14 is a block diagram showing the details of the configuration of the control unit shown in FIG. 12.

As a method for detecting excess/shortage of power during operation, a method of detecting the voltage VL1 of the capacitor 3 may be used. FIG. 13 and FIG. 14 show an example of the configuration diagram of the control unit 100 in the case where, for example, the operation state 1-A and the operation state 1-B are switched using the voltage VL1 of the capacitor 3.

First, control in the operation state 1-A will be described. As described above, the operation state 1-A corresponds to the case where the AC power supply 1 is connected and is used as a power supply source for the power supply system, and input power P1_in from the AC power supply 1 is distributed into charge power P2_out for the first DC power supply 11, supply power P3_out for the AC load connected to the load device connection end 21, and charge power P4_out for the second DC power supply 34.

In FIG. 13 and FIG. 14, control blocks for the operation state 1-A are represented by, for example, control blocks C1 to C7 in the gate signal calculation circuit 102. The control by the control blocks C1 to C7 is a control example of performing such operation that supply power P3_out for the AC load connected to the load device connection end 21 and charge power P4_out for the second DC power supply 34 are prioritized, and the remaining power is supplied as charge power P2_out for the first DC power supply 11.

In this case, as shown in the control block C1 in FIG. 13, the AC/DC converter 2 supplies power with constant current. That is, for the AC/DC converter 2, a deviation between a current command value Iacin* for the AC power supply 1 and a current detection value Iacin from the voltage current detection unit 51 is subjected to proportional control (P control), and PWM control is performed, thereby supplying power to the capacitor 3 with constant current and at the same time, controlling AC current at a high power factor. At this time, the current command value Iacin* for the AC power supply 1 may be set arbitrarily.

As shown in the control block C2 in FIG. 13, for the first switching circuit 4, PWM operation is performed at a constant time ratio based on an arbitrary time ratio command value Duty*, thereby supplying AC power to the transformer 6.

As shown in the control block C3 in FIG. 13, for the second switching circuit 8, proportional integral control (PI control) is performed on the basis of a deviation between a voltage command value VL1* for the capacitor 3 and the voltage detection value VL1 from the voltage current detection unit 52, to obtain a current command value Ibat1* for the first DC power supply 11. A deviation between the current command value Ibat1* and a current detection value Ibat1 from the voltage current detection unit 53 is subjected to proportional control (P control), and PWM control is performed, thereby performing charge current control for the first DC power supply 11. At this time, as shown in the control block C4 in FIG. 13, the switch 9 is turned off, to cause the second switching circuit 8 to function as a full-bridge step-up chopper.

As shown in the control block C5 in FIG. 14, for the third switching circuit 13, proportional integral control (PI control) is performed on the basis of a deviation between a voltage command value VL2* for the smoothing capacitor 15 and the voltage detection value VL2 from the voltage current detection unit 54, and PWM control is performed, thereby controlling the voltage VL2 of the smoothing capacitor 15.

As shown in the control block C6 in FIG. 14, for the inverter 17, a quotient of a command value Vacout* for the output AC voltage and the voltage detection value VL2 from the voltage current detection unit 54 is used as a modulation rate for a sinewave inverter, and PWM control is performed, thereby outputting the AC voltage Vacout to the load device connection end 21.

As shown in the control block C7 in FIG. 14, for the switching element 33 composing the fourth switching circuit 30, proportional integral control (PI control) is performed on the basis of a deviation between a voltage command value Vbat2* for the second DC power supply 34 and the voltage detection value Vbat2 from the voltage current detection unit 56, and PWM control is performed, thereby performing charge voltage control for the second DC power supply 34.

As described above, in the case of operation state 1-A, the gate signals calculated in the control blocks C1 to C4 are inputted through output switch units 103a to 103d to the AC/DC converter 2, the first switching circuit 4, the second switching circuit 8, and the switch 9, respectively. The gate signals calculated in the control blocks C5 to C7 are inputted to the third switching circuit 13, the inverter 17, and the switching element 33 of the fourth switching circuit 30, respectively.

Next, the operation state determination circuit 101 shown in FIG. 14 will be described. Here, the operation state determination circuit 101 is configured as a circuit for determining whether the voltage VL1 of the capacitor 3 increases or decreases.

That is, a subtractor 101a calculates a deviation between the voltage output value VL1 of the voltage current detection unit 52 and the voltage command value VL1* for the capacitor 3. A voltage variation upper limit value ΔVL1 is set arbitrarily, and a voltage variation lower limit value −ΔVL1 obtained by multiplying ΔVL1 by −1 is set. Then, comparators 101b and 101c respectively compare the voltage variation upper limit value ΔVL1 and the voltage variation lower limit value −ΔVL1 with the deviation calculated by the subtractor 101a.

When the voltage output value VL1 of the capacitor 3 increases by ΔVL1 or more from the voltage command value VL1*, an increase determination signal Sig_VL1_High outputted from the comparator 101b becomes 1. Similarly, when the voltage output value VL1 of the capacitor 3 decreases by Δ VL1 or more from the voltage command value VL1*, a decrease determination signal Sig_VL1_Low outputted from the comparator 101c becomes 1. A state determination unit 101d detects rising of these determination signals, thereby generating an operation state determination signal.

The operation state determination signal from the state determination unit 101d is inputted to the output switch units 103a to 103d of the output switch circuit 103. In accordance with the operation state determination signal, the output switch units 103a to 103d switch the respective gate signals outputted from the gate signal calculation circuit 102.

For example, when operation is performed in the operation state 1-A, if the entire power outputted to the load device connection end 21, the first DC power supply 11, and the second DC power supply 34 as loads increases and input power from the AC power supply 1 becomes insufficient, the voltage output value VL1 of the capacitor 3 decreases. Then, when the voltage output value VL1 of the capacitor 3 decreases by ΔVL1 or more from the voltage command value VL1*, the decrease determination signal Sig_VL1_Low becomes 1. Rising of the determination signal is detected by the state determination unit 101d, and in response thereto, the state determination unit 101d outputs an operation state determination signal to the output switch unit 103a. The output switch unit 103a switches the gate signal calculated in the control block C1, to a gate signal of 0, whereby the gate signal outputted to the AC/DC converter 2 becomes 0 and operation of the AC/DC converter 2 is stopped.

Similarly, the output switch unit 103b switches the gate signal calculated in the control block C2, to a gate signal of 0, whereby the gate signal for the first switching circuit 4 also becomes 0 and the operation thereof is stopped.

Further, the output switch unit 103c sets the ON time of the second switching circuit 8 to a predetermined Duty*, instead of the gate signal calculated in the control block C3, and the output switch unit 103d switches the gate signal for the switch 9 from 0 to 1, to turn on the switch 9, whereby the power supply source is switched from the AC power supply 1 to the first DC power supply 11. That is, the operation state is switched from 1-A to the operation state 1-B. At this time, components such as the third switching circuit 13, the inverter 17, and the fourth switching circuit 30, which continue to operate through the same control calculations (e.g., control blocks C5 to C7) irrespective of the operation state, are continuously operated without the gate signals therefor being switched.

As described above, in the case of the capacitor 3 used for smoothing output voltage of the AC/DC converter 2, when input power from the input side increases or output power supplied to the output side decreases, the capacitor voltage increases transiently. On the other hand, when input power from the input side decreases or output power supplied to the output side increases, the capacitor voltage decreases transiently. By detecting such a phenomenon by using the voltage detection value VL1 from the voltage current detection unit 51 for the capacitor 3, excess/shortage of input power relative to output power in the power conversion device in FIG. 1 and FIG. 2 is detected, whereby switching between the operation state 1-A and the operation state 1-B can be performed.

In the same manner as described above, voltage variation in the smoothing capacitor 15 connected on the output side of the third switching circuit 13 is detected, whereby the power supply can be switched among the AC power supply 1, the first DC power supply 11, and the second DC power supply 34.

That is, in the operation state 1-A, when voltage of the capacitor 15 decreases to be smaller than a predetermined threshold value, since voltage of the capacitor 3 has also decreased, operation of the first switching circuit 4 is stopped and the operation state is switched to a state in which the first DC power supply 11 is used as the power supply. That is, the operation state 1-A is switched to the operation state 1-B.

In the operation state 1-B, when voltage of the capacitor 15 decreases to be smaller than a predetermined threshold value, since the charge power in the first DC power supply 11 has decreased, operation of the second switching circuit 8 is stopped and the operation state is switched to a state in which the second DC power supply 34 is used as the power supply. That is, the operation state 1-B is switched to the operation state 1-C.

In the operation state 1-C, when voltage of the capacitor 15 decreases to be smaller than a predetermined threshold value, since the charge power in the second DC power supply 34 has decreased, operation of the fourth switching circuit 30 is stopped. That is, the operation state 1-C is switched to the operation state 1-D.

Thus, by using the method of detecting voltages of the capacitors 3 and 15, it becomes possible to switch the power supply source and continue the control operation, without individually detecting whether or not the AC power supply 1 is connected and whether power for the load devices increases or decreases.

Other than the above, as a method for detecting excess/shortage of power during operation, a method of detecting voltage and current of the AC power supply 1 may be used. That is, whether or not the input power P1_in from the AC power supply 1 is zero is detected using a result of detection by the voltage current detection unit 51 which detects voltage and current of the AC power supply 1, whereby whether or not the AC power supply 1 is connected is detected and thus switching between the operation state 1-A and the operation state 1-B can be performed.

Similarly, excess/shortage of power can be detected from detection values of voltages or currents of the first DC power supply 11 and the second DC power supply 34. For example, upper limit values are respectively set on charge currents and discharge currents for the first DC power supply 11 and the second DC power supply 34. Then, a state in which charging is performed with current equal to or greater than the upper limit value for the charge current is determined to be a state in which there is surplus power, and a state in which discharging is performed with current equal to or greater than the upper limit value for the discharge current is determined to be a state in which the power is insufficient. Thus, switching between the operation state 1-B and the operation state 1-C or switching between the operation state 1-C and the operation state 1-D can be performed.

In switching the operation state, as shown in FIG. 12 to FIG. 14, the gate signals for all the operation modes are calculated and necessary signals are outputted on the basis of the operation state determination signal from the operation state determination circuit 101. However, instead of this method, the operation state determination signal from the operation state determination circuit 101 may be inputted to the gate signal calculation circuit 102, and only the gate signals for the corresponding operation state may be calculated, whereby the operation state can be switched. By using this method, it becomes possible to perform control with the minimum necessary calculation amount in the case of performing calculation processing by a digital device such as a microcomputer.

In switching the operation state, by restricting the supply amount of power to one of the loads that are the power reception parts other than a part serving as a power supply source so as to reduce the total power supplied to the loads, supply of power to a load having a high priority can be maximally continued.

For example, in the operation state 1-C, i.e., when operation is performed with the second DC power supply 34 used as the power supply, by stopping a power supplying operation for the first DC power supply 11 in advance, shift to the operation state 1-D can be avoided in advance and supply of power to the AC load connected to the load device connection end 21 can be continued.

A DC power supply that has plenty of charge amount may be determined from voltages or currents of the first DC power supply 11 and the second DC power supply 34, or the like, and power may be supplied from the DC power supply that has plenty of charge amount to the load devices. When power is being supplied to the load devices from the first DC power supply 11 or the second DC power supply 34, by switching to supply of power from the AC power supply 1, control of prioritizing supply of power from the AC power supply 1 over discharge from the first DC power supply 11 or the second DC power supply 34, can be achieved.

As described above, in the power conversion device of the present embodiment 1, when power supplied from the power supply is insufficient for the load power, power shortage is detected and the power supply can be switched to a power supply that is capable of supplying power, whereby supply of power to the load can be continued.

Embodiment 2

Figure 15:
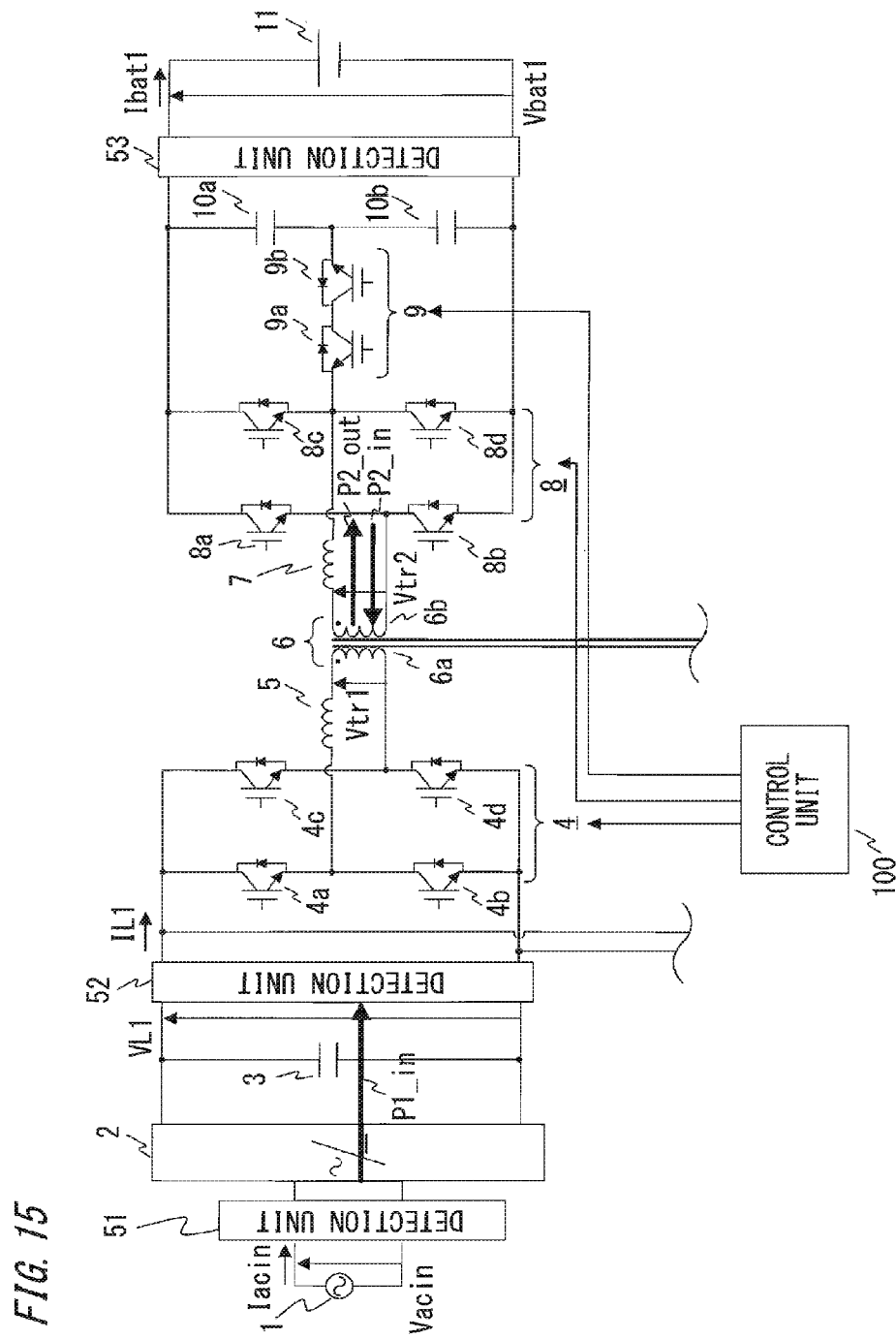
FIG. 15 is a circuit configuration diagram of a power conversion device according to embodiment 2 of the present invention.
Figure 16:
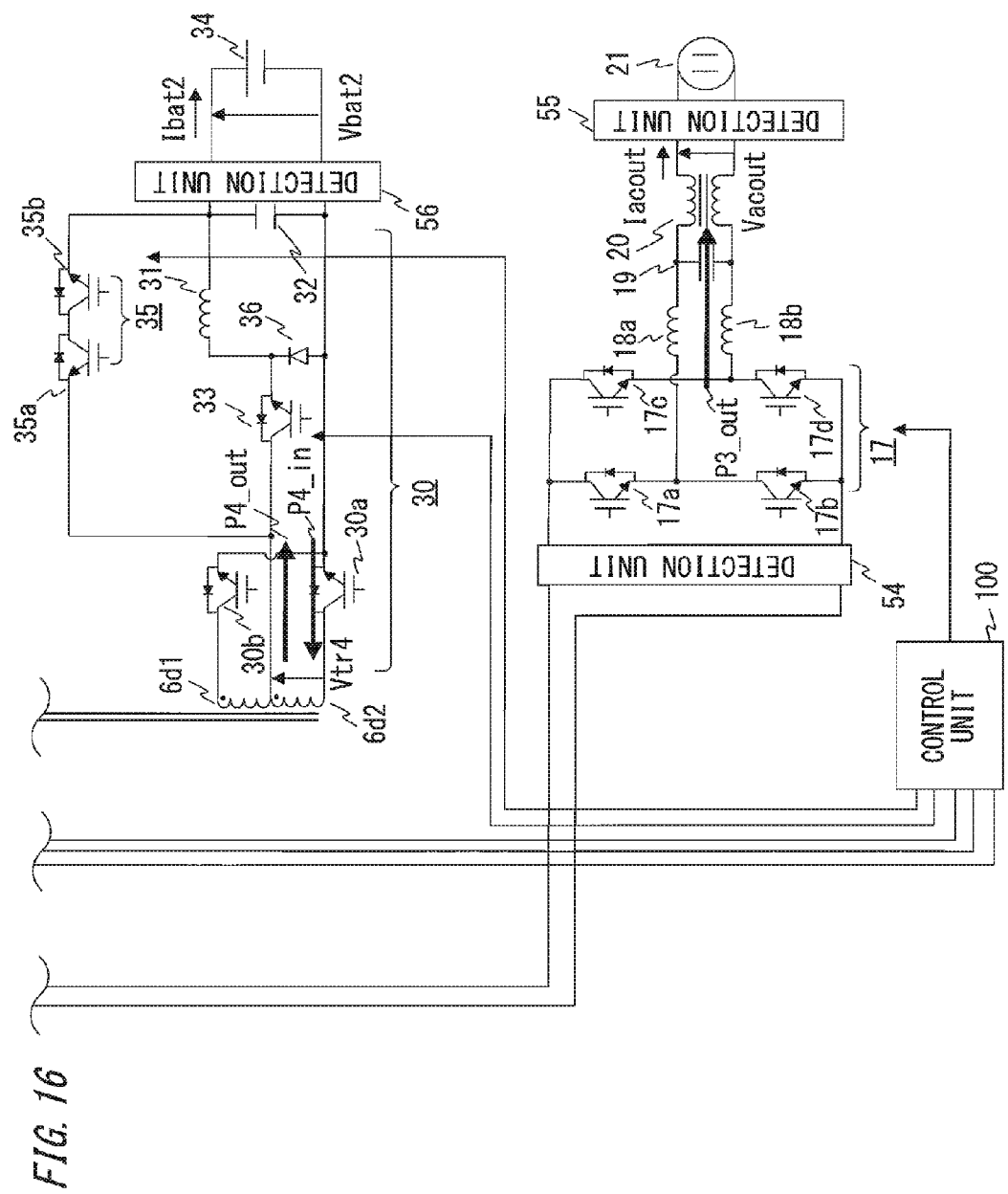
FIG. 16 is a circuit configuration diagram of the power conversion device according to embodiment 2 of the present invention.

FIG. 15 and FIG. 16 are circuit configuration diagrams of a power conversion device according to embodiment 2 of the present invention, and the components that correspond to or are the same as those in embodiment 1 shown in FIG. 1 and FIG. 2 are denoted by the same reference characters.

A configuration feature of embodiment 2 is that, on the output end side of the AC/DC converter 2, the DC input end of the inverter 17 composed of the four switching elements 17a to 17dc is connected in parallel with the first switching circuit 4 via the voltage current detection unit 54. To the AC output end of the inverter 17, the smoothing coils 18a and 18b, the smoothing capacitor 19, the common mode choke coil 20, the voltage current detection unit 55, and the load device connection end 21 are connected in this order. At the load device connection end 21, the AC voltage Vacout is generated which is a power supply for the AC load (not shown).

The other configuration is basically the same as in embodiment 1. Therefore, the corresponding components are denoted by the same reference characters and the detailed description thereof is omitted. The operations of the first, second, and fourth switching circuits 4, 8, and 30, the inverter 17, and the like are also basically the same as in embodiment 1, and therefore the detailed description thereof is omitted here.

Arrows shown in FIG. 15 and FIG. 16 define power directions in the power conversion device according to embodiment 2 of the present invention.

Here, power supplied from the AC power supply 1 through the AC/DC converter 2 to the capacitor 3 is denoted by P1_in. Power supplied from the second winding 6b on the secondary side of the transformer through the second switching circuit 8 to the first DC power supply 11 is denoted by P2_out. Power supplied from the first DC power supply 11 through the second switching circuit 8 to the second winding 6b on the secondary side of the transformer is denoted by P2_in.

Power supplied from the capacitor 3 through the inverter 17 to the AC load connected to the load device connection end 21 is denoted by P3_out. Power supplied from the fourth windings 6d1 and 6d2 on the quaternary side of the transformer through the fourth switching circuit 30 to the second DC power supply 34 is denoted by P4_out. Power supplied from the second DC power supply 34 through the switching elements 30a and 30b to the fourth windings 6d1 and 6d2 on the quaternary side of the transformer is denoted by P4_in.

As the operation state of the power conversion device in embodiment 2 shown in FIG. 15 and FIG. 16, there are four operation states [2-A to 2-D] shown in FIG. 17 to FIG. 24. These four operation states will be described.

Figure 17:
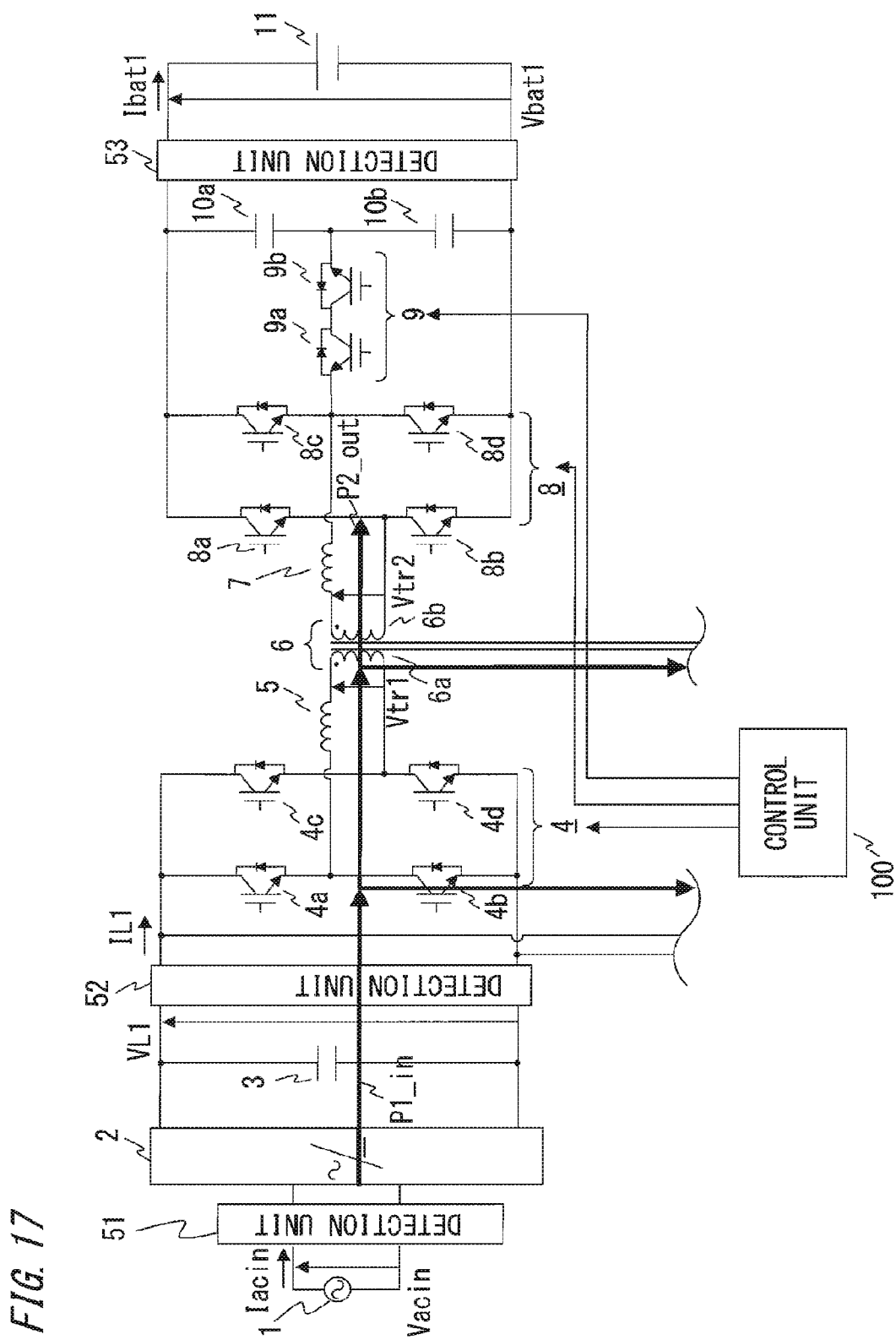
FIG. 17 is an explanation diagram of power flow in an operation state 2-A of the power conversion device according to embodiment 2 of the present invention.
Figure 18:
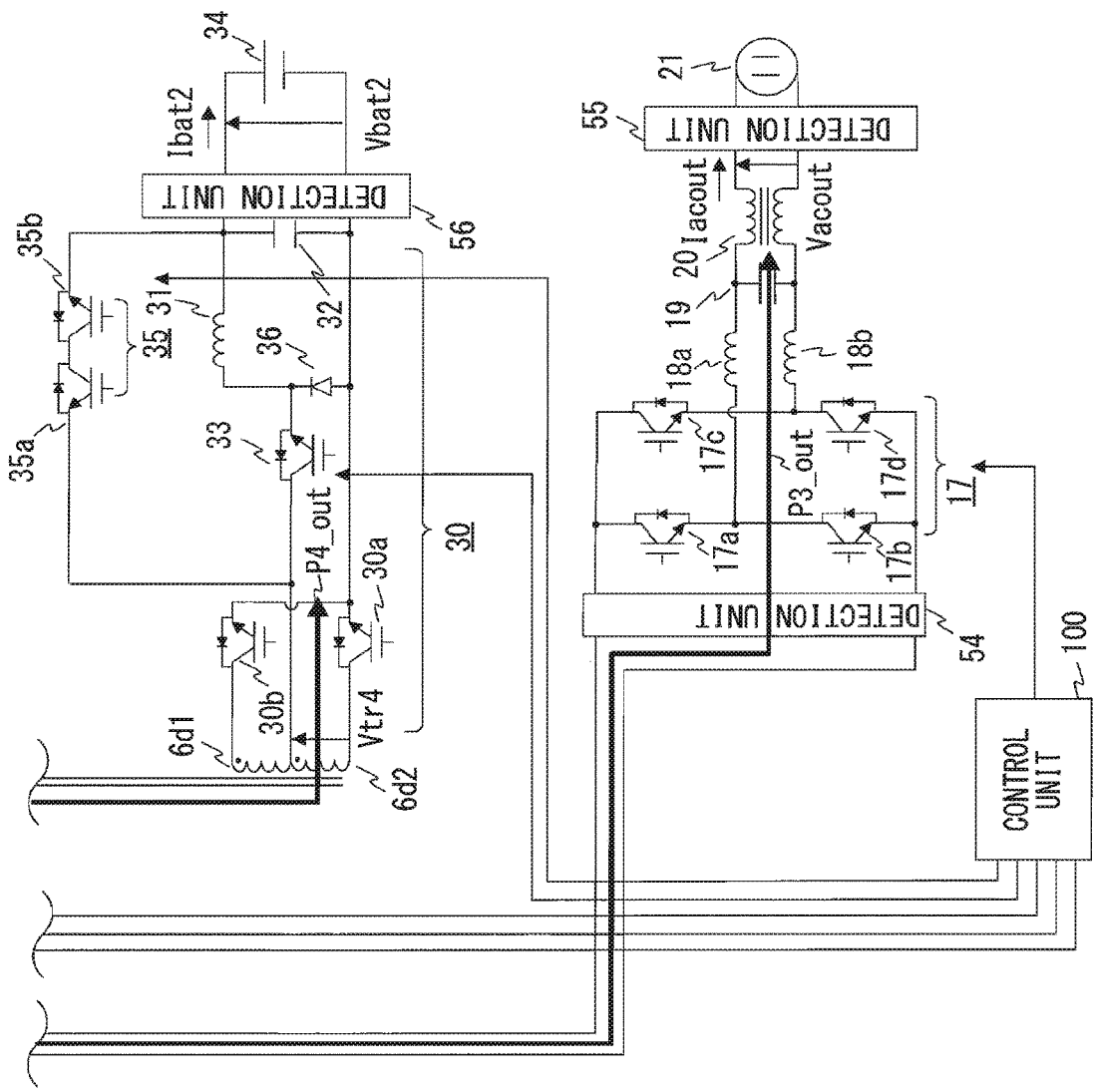
FIG. 18 is an explanation diagram of power flow in the operation state 2-A of the power conversion device according to embodiment 2 of the present invention.

FIG. 17 and FIG. 18 show power flow in the operation state 2-A. This is the case where the AC power supply 1 is connected and the AC power supply 1 is used as a power supply source. In this case, the input power P1_in from the AC power supply 1 is distributed into charge power P2_out for the first DC power supply, supply power P3_out for the AC load connected to the load device connection end 21, and charge power P4_out for the second DC power supply 34.

Figure 19:
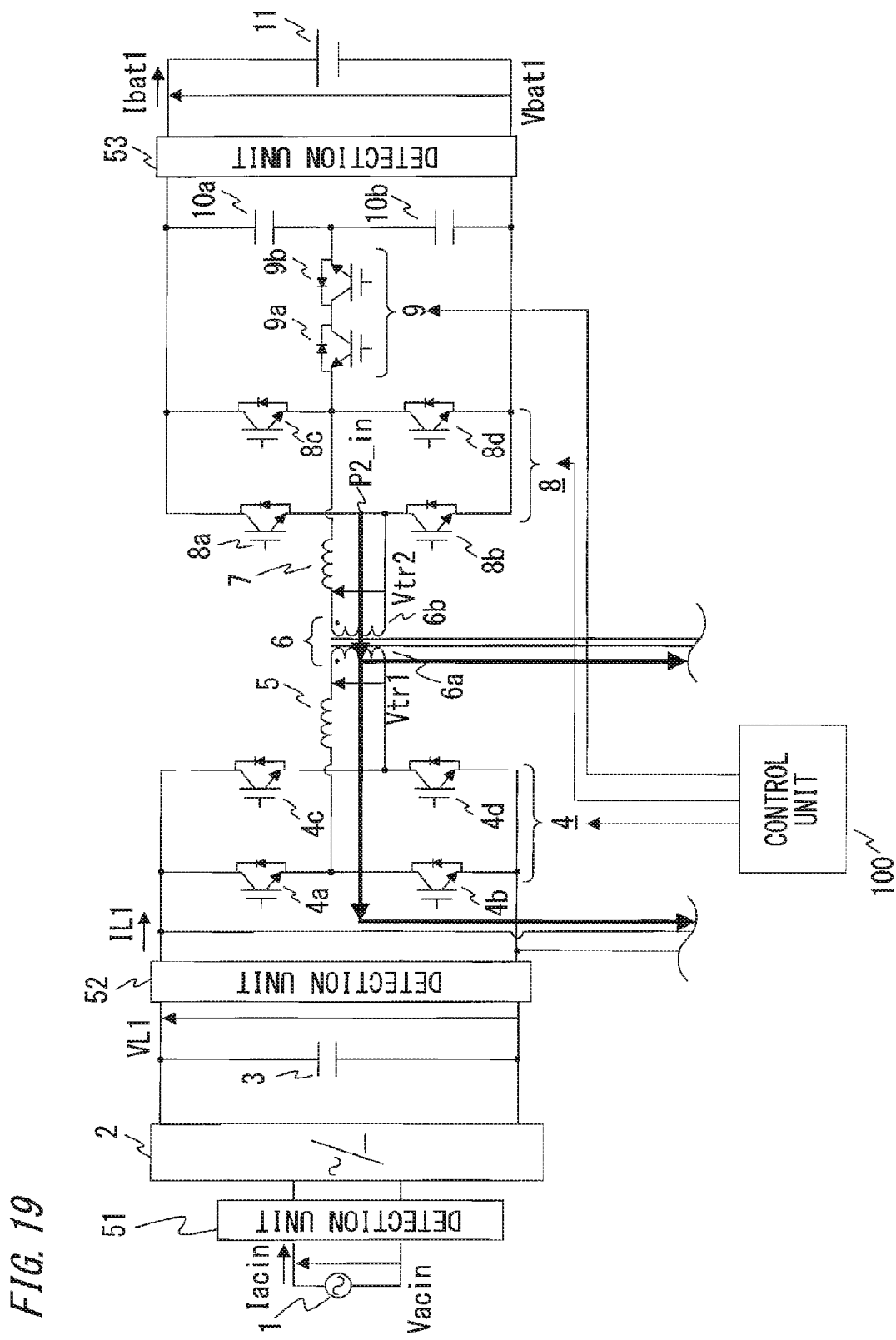
FIG. 19 is an explanation diagram of power flow in an operation state 2-B of the power conversion device according to embodiment 2 of the present invention.
Figure 20:
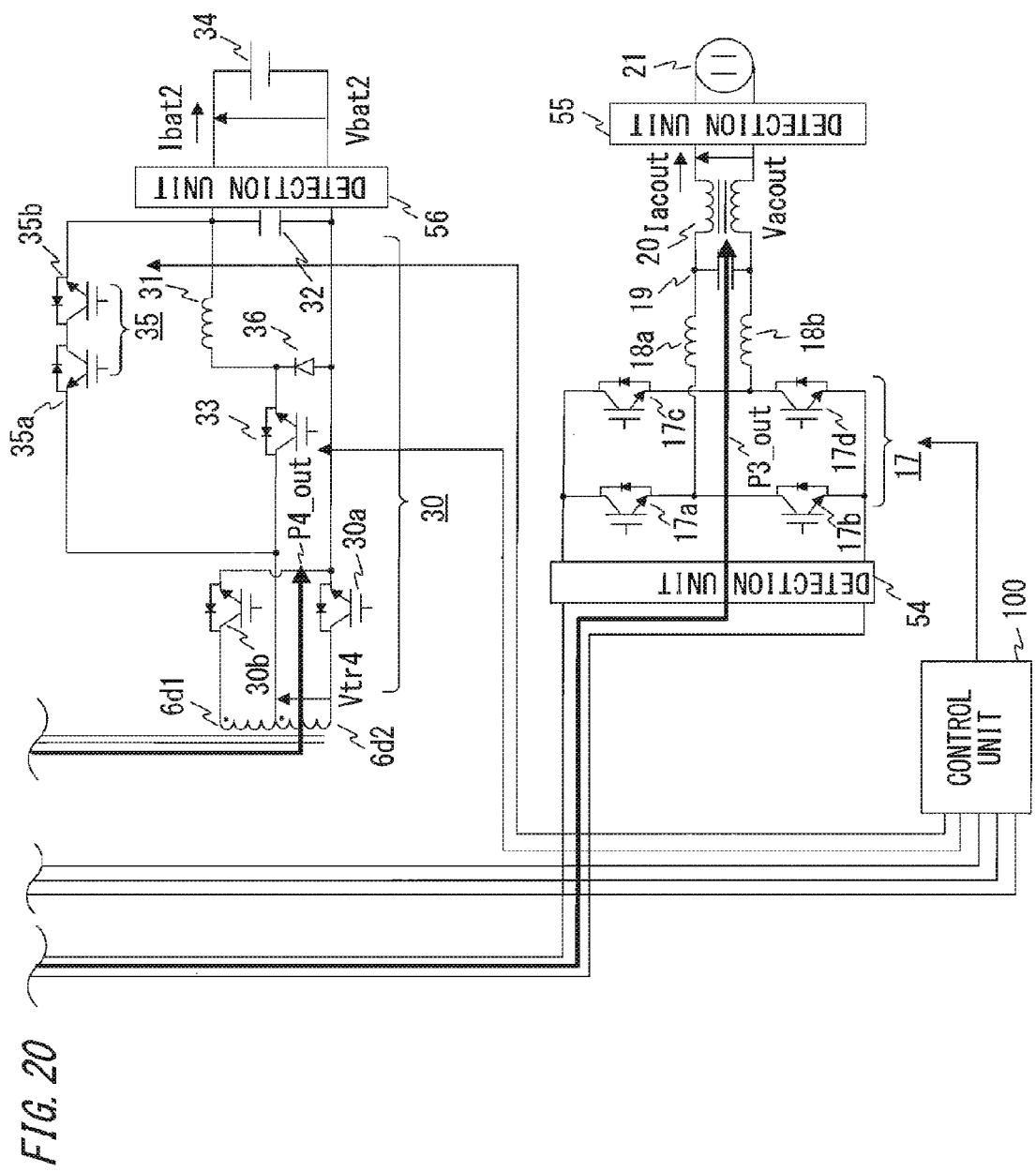
FIG. 20 is an explanation diagram of power flow in the operation state 2-B of the power conversion device according to embodiment 2 of the present invention.

FIG. 19 and FIG. 20 show power flow in the operation state 2-B. This is the case where, for such a reason that the AC power supply 1 is not connected, there is no input power P1_in from the AC power supply 1, and the first DC power supply 11 is used as a power supply source. In this case, discharge power P2_in from the first DC power supply 11 is distributed into supply power P3_out for the AC load connected to the load device connection end 21, and charge power P4_out for the second DC power supply 34.

Figure 21:
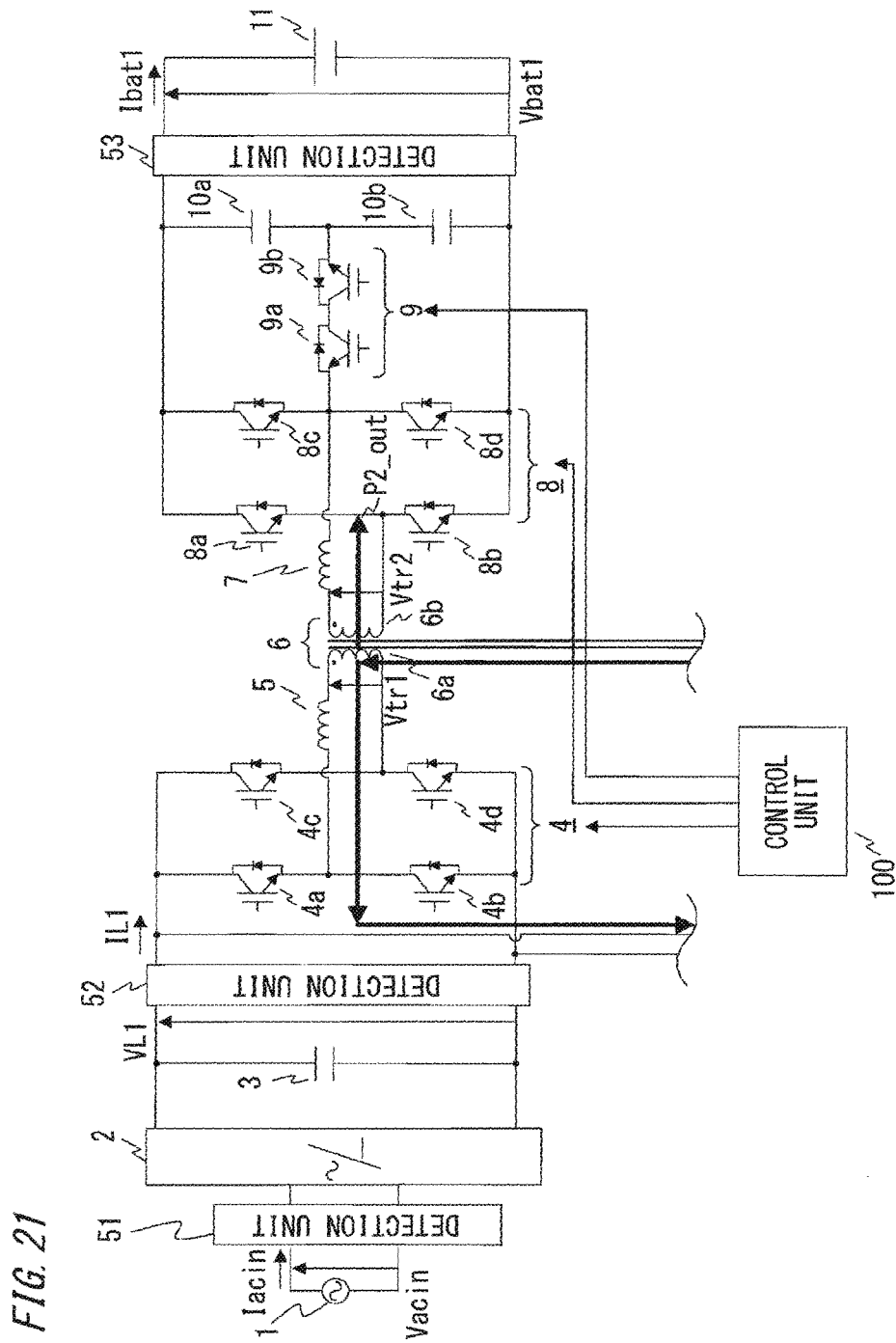
FIG. 21 is an explanation diagram of power flow in an operation state 2-C of the power conversion device according to embodiment 2 of the present invention.
Figure 22:
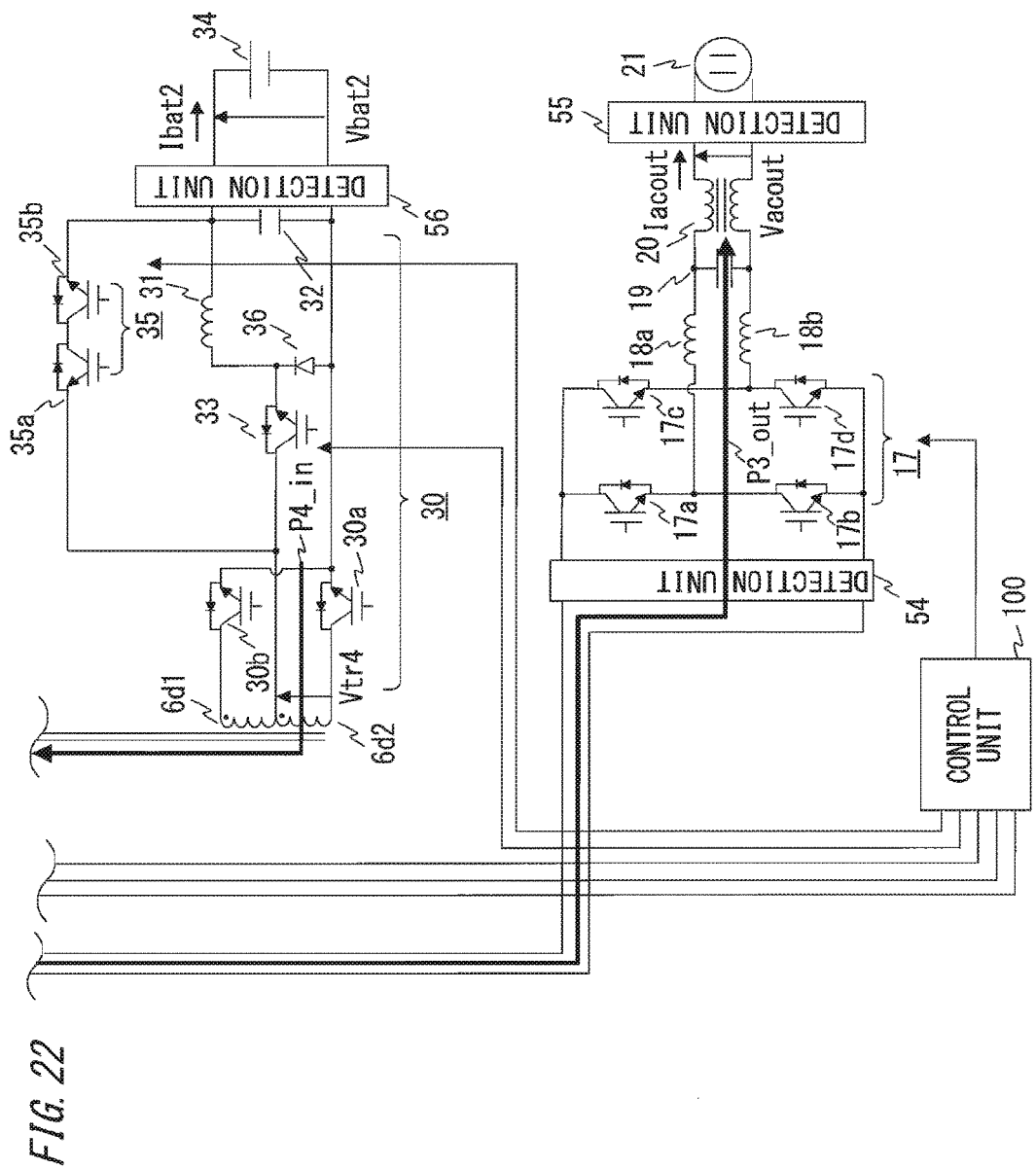
FIG. 22 is an explanation diagram of power flow in the operation state 2-C of the power conversion device according to embodiment 2 of the present invention.

FIG. 21 and FIG. 22 show power flow in the operation state 2-C. This is the case where, for such a reason that the AC power supply 1 is not connected, there is no input power P1_in from the AC power supply 1, and since the charge power in the first DC power supply 11 is insufficient, the second DC power supply 34 is used as a power supply source. In this case, discharge power P4_in from the second DC power supply 34 is distributed into charge power P2_out for the first DC power supply 11 and supply power P3_out for the AC load connected to the load device connection end 21.

In FIG. 17 to FIG. 22, the case where all the power reception parts other than a part serving as a power supply source are regarded as loads and power is supplied to these loads, has been described, but the case where powers supplied to the loads other than one of them are set to zero is also included. For example, in FIG. 17 and FIG. 18, supply power P2_out for the first DC power supply may be set to zero, or supply power P2_out for the first DC power supply and supply power P3_out for the AC load connected to the load device connection end 21 may both be set to zero.

Figure 23:
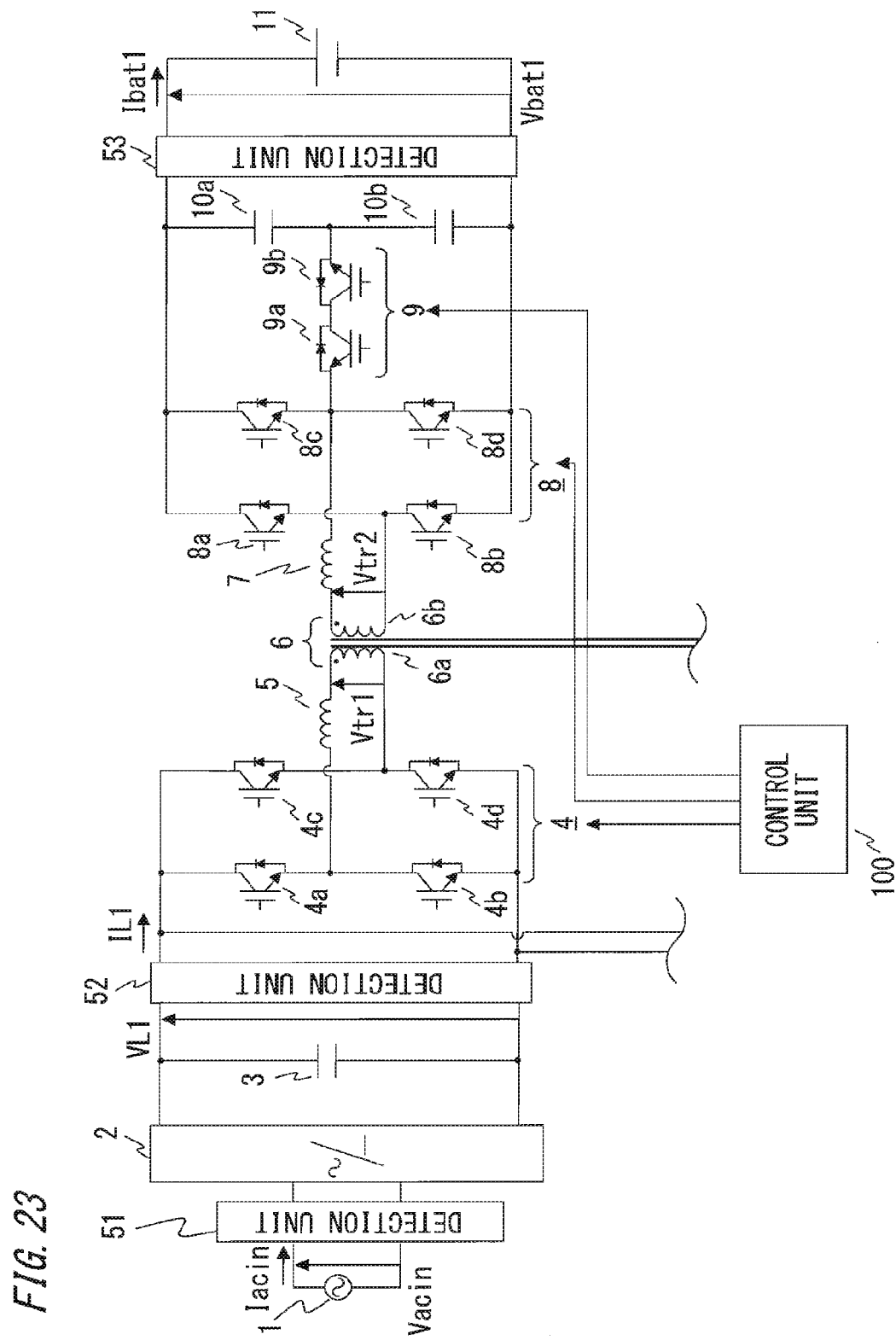
FIG. 23 is an explanation diagram of power flow in an operation state 2-D of the power conversion device according to embodiment 2 of the present invention.
Figure 24:
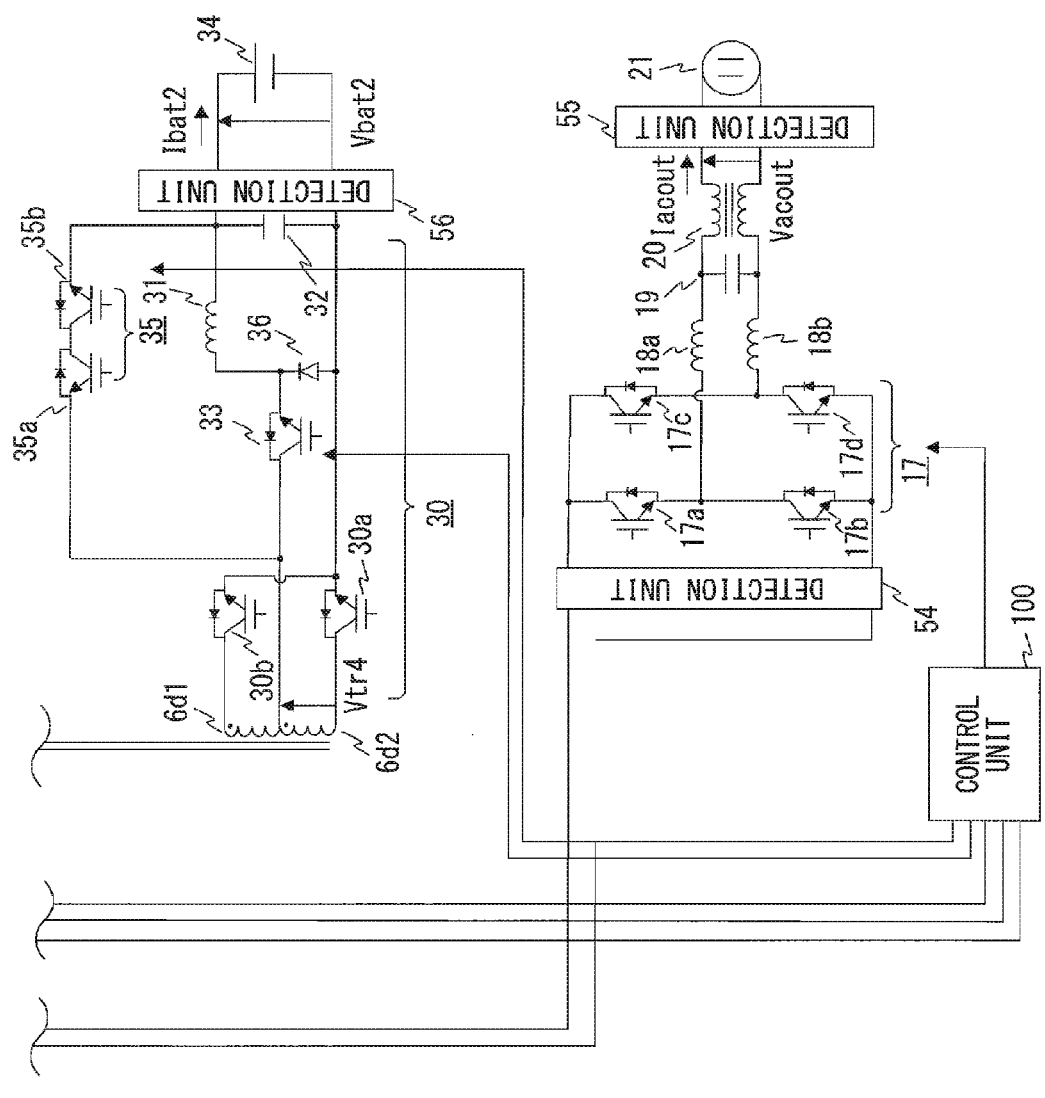
FIG. 24 is an explanation diagram of power flow in the operation state 2-D of the power conversion device according to embodiment 2 of the present invention.

FIG. 23 and FIG. 24 show power flow in the operation state 2-D. This is the case where there is no input power P1_in from the AC power supply 1, and charge powers in the first DC power supply 11 and the second DC power supply 34 are both insufficient so that discharge cannot be performed, or the case where power is supplied to none of the first DC power supply 11, the AC load connected to the load device connection end 21, and the second DC power supply 34. In this case, the power conversion device stops all the operations, and all the power flows become zero.

Figure 25:
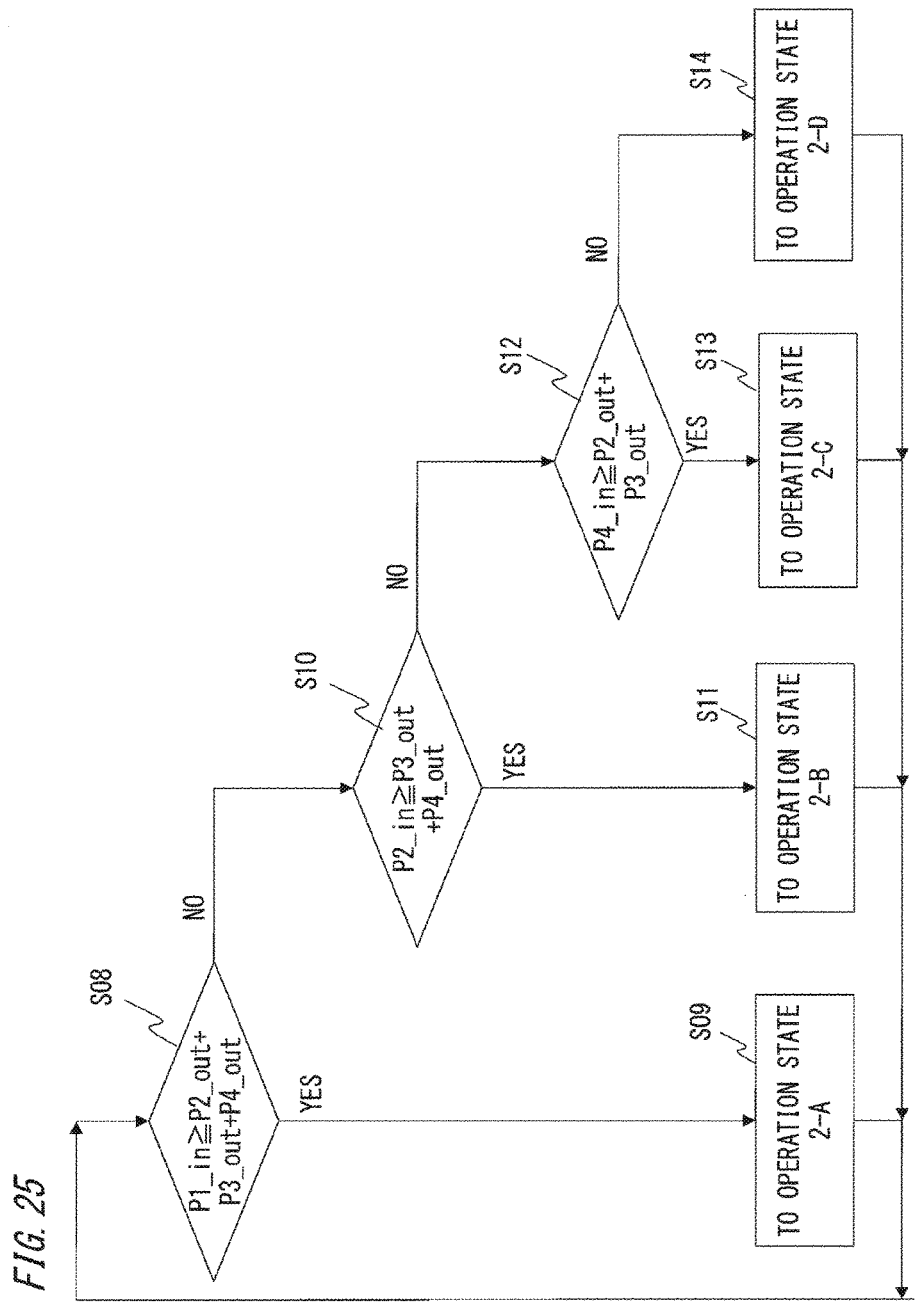
FIG. 25 is an explanation diagram of a flowchart of operation state switch control according to embodiment 2 of the present invention.

FIG. 25 shows a flowchart of operation state switch control.

First, in step S08, it is determined whether total power of charge power P2_out for the first DC power supply 11, supply power P3_out for the AC load connected to the load device connection end 21, and charge power P4_out for the second DC power supply 34, as loads, can be covered by input power P1_in from the AC power supply 1. If it is determined that the total power can be covered in step S08 (YES), the process shifts to step S09 and the operation state is determined to be the operation state 2-A.

If it is determined that the total power cannot be covered in step S08 (NO), the process shifts to step S10. In step S10, supply of power from the AC power supply 1 is stopped, the first DC power supply 11 is used as a power supply source, and it is determined whether total power of supply power P3_out for the AC load connected to the load device connection end 21 and charge power P4_out for the second DC power supply 34, as loads, can be covered by input power P2_in from the first DC power supply 11. If it is determined that the total power can be covered in step S10 (YES), the process shifts to step S11 and the operation state is determined to be the operation state 2-B.

If it is determined that the total power cannot be covered in step S10 (NO), the process shifts to step S12. In step S12, supply of power from the first DC power supply 11 is stopped, the second DC power supply 34 is used as a power supply source, and it is determined whether total power of charge power P2_out for the first DC power supply 11 and supply power P3_out for the AC load connected to the load device connection end 21, as loads, can be covered by input power P4_in from the second DC power supply 34. If it is determined that the total power can be covered in step S12 (YES), the process shifts to step S13 and the operation state is determined to be the operation state 2-C. On the other hand, if it is determined that the total power cannot be covered in step S12, the process shifts to step S14 and the operation state is determined to be the operation state 2-D.

As is found from the flowchart shown in FIG. 25, when operation is performed in the operation state 2-A, if input power from the AC power supply 1 decreases or if power supplied to one of the loads increases and power supplied to the loads exceeds the input power from the AC power supply 1, power reception from the AC power supply 1 is stopped and discharge from the first DC power supply 11 is prioritized. At this time, if the first DC power supply 11 has been charged, the operation state can be switched to the operation state 2-B.

Even in the case where the first DC power supply 11 has not been charged, if the second DC power supply 34 has been charged, the operation state can be switched to the operation state 2-C. If both the first DC power supply 11 and the second DC power supply 34 have not been charged, the operation state can be switched to the operation state 2-D which is a stopped state.

When operation is performed in the operation state 2-B, if the AC power supply 1 is connected or if power supplied to the loads decreases, the operation state can be switched to the operation state 2-A. If discharge power from the first DC power supply 11 decreases, the operation state can be switched to the operation state 2-C.

When operation is performed in the operation state 2-C, if the AC power supply 1 is connected or if power supplied to the loads decreases, the operation state can be switched to the operation state 2-A. If discharge power from the second DC power supply 34 decreases, the operation state can be switched to the operation state 2-D.

In the flowchart shown in FIG. 25, step S08 is set as the determination at the uppermost stage so that power from the AC power supply 1 can be preferentially used. However, without limitation thereto, if it is desired to prioritize discharge from each DC power supply, step S10 or step S12 may be set as the determination at the uppermost stage. Alternatively, step S12 may be set as the determination at the stage subsequent to step S08, and step S10 may be set as the determination at the stage subsequent to step S12.

Figure 26:
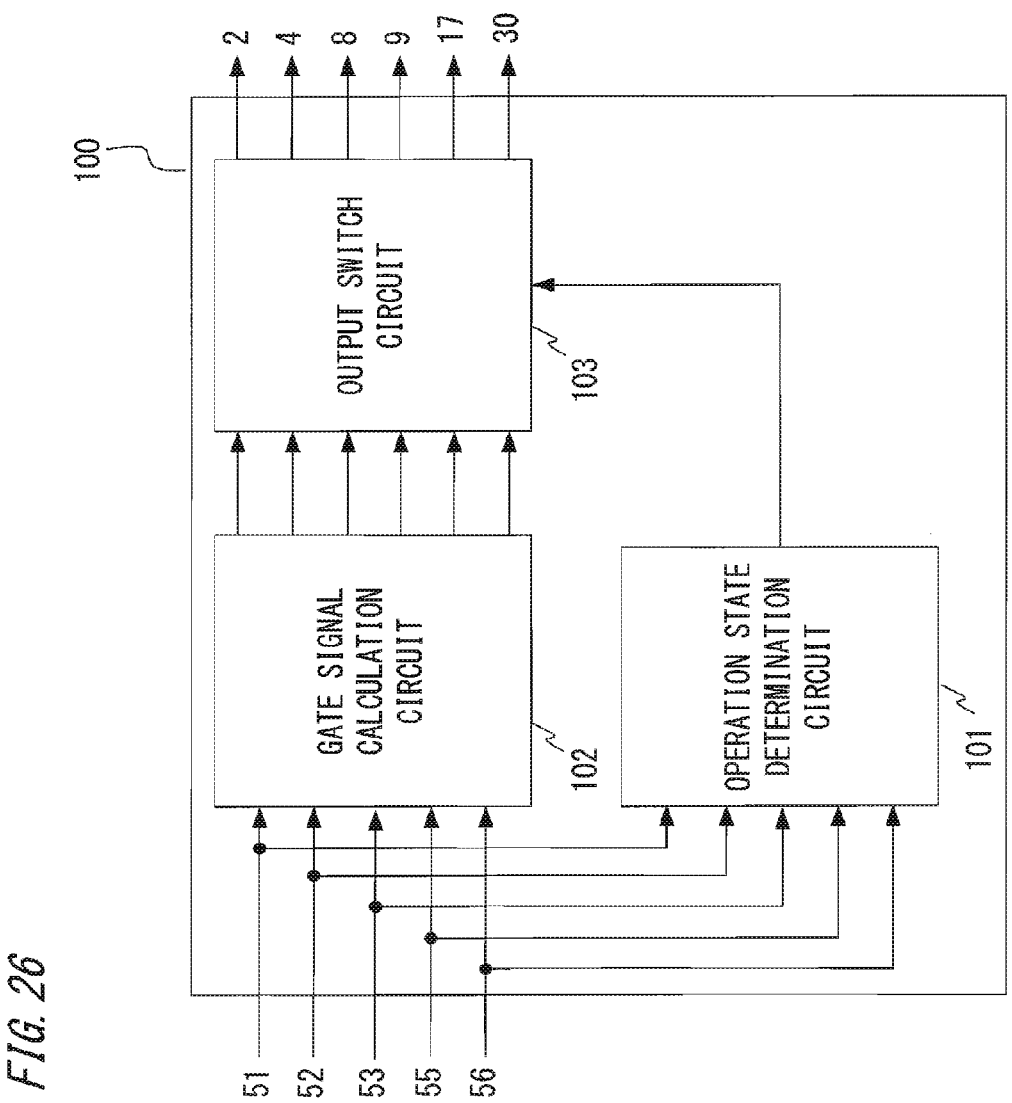
FIG. 26 is a block diagram showing the configuration of a control unit of the power conversion device according to embodiment 2 of the present invention.

FIG. 26 shows a configuration diagram of the control unit 100 for executing the operation state switch control flow shown in FIG. 25.

The control unit 100 includes the gate signal calculation circuit 102 for controlling the AC/DC converter 2, the first, second, and fourth switching circuits 4, 8, 30, the switch 9, and the inverter 17. The gate signal calculation circuit 102 calculates gate signals on the basis of detection signals from voltage current detection units 51 to 53, 55, 56. The operation state determination circuit 101 performs determination as to the operation states of the AC/DC converter 2, the first, second, and fourth switching circuits 4, 8, 30, the switch 9, and the inverter 17 on the basis of the detection signals from the voltage current detection units 51 to 53, 55, 56, and calculates an operation state determination signal indicating a result of the determination. On the basis of the operation state determination signal from the operation state determination circuit 101, the output switch circuit 103 selects and outputs gate signals corresponding to the operation state among the gate signals from the gate signal calculation circuit 102. However, voltage current detection signals that are not used for calculation of the gate signals or determination as to the operation state may not be inputted to the control unit 100.

The voltage current detection unit 51 corresponds to a voltage detection unit for detecting voltage of the AC power supply 1 in claims. The voltage current detection unit 52 corresponds to a voltage detection unit for detecting voltage of the capacitor 3 in claims. The output switch circuit 103 corresponds to a power supply switch unit in claims.

Figure 27:
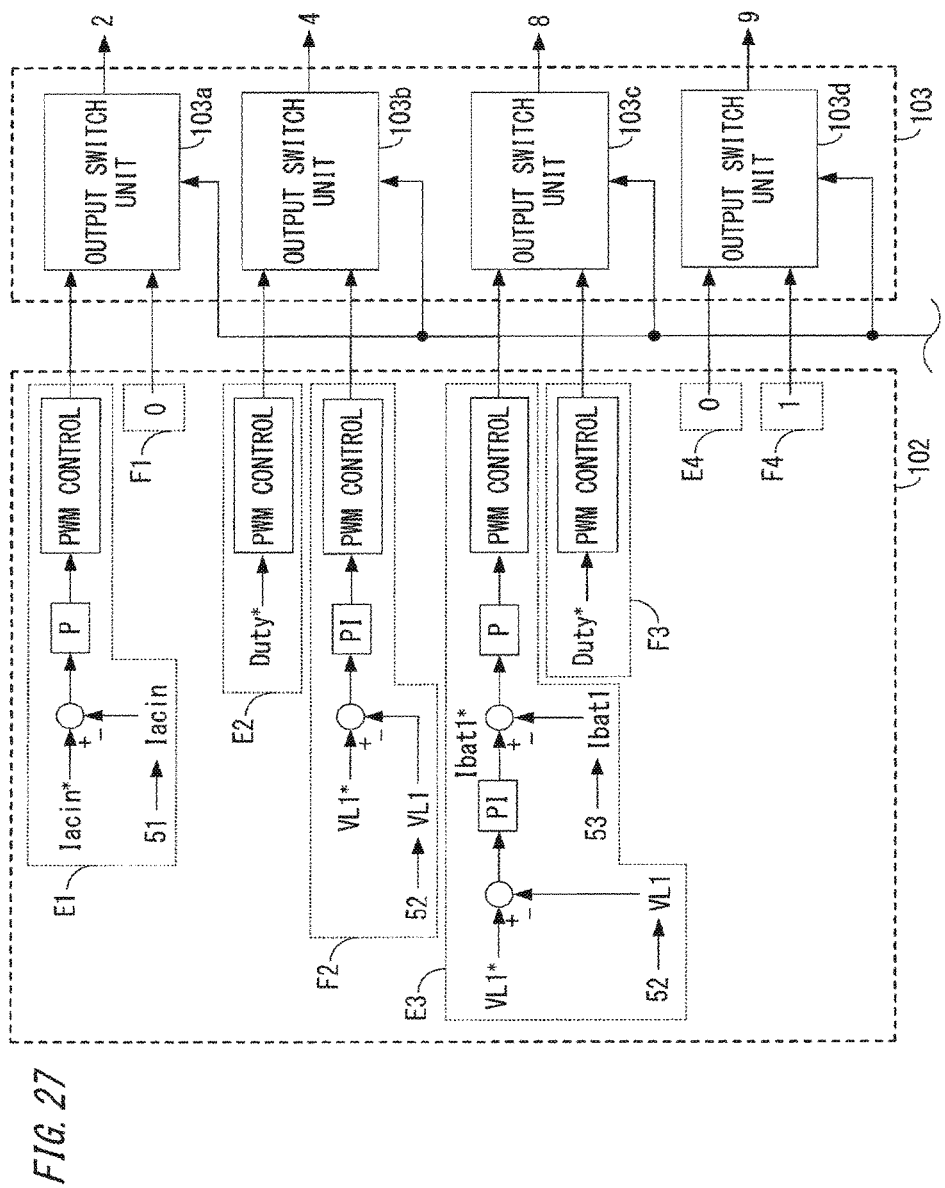
FIG. 27 is a block diagram showing the details of the configuration of the control unit shown in FIG. 26.
Figure 28:
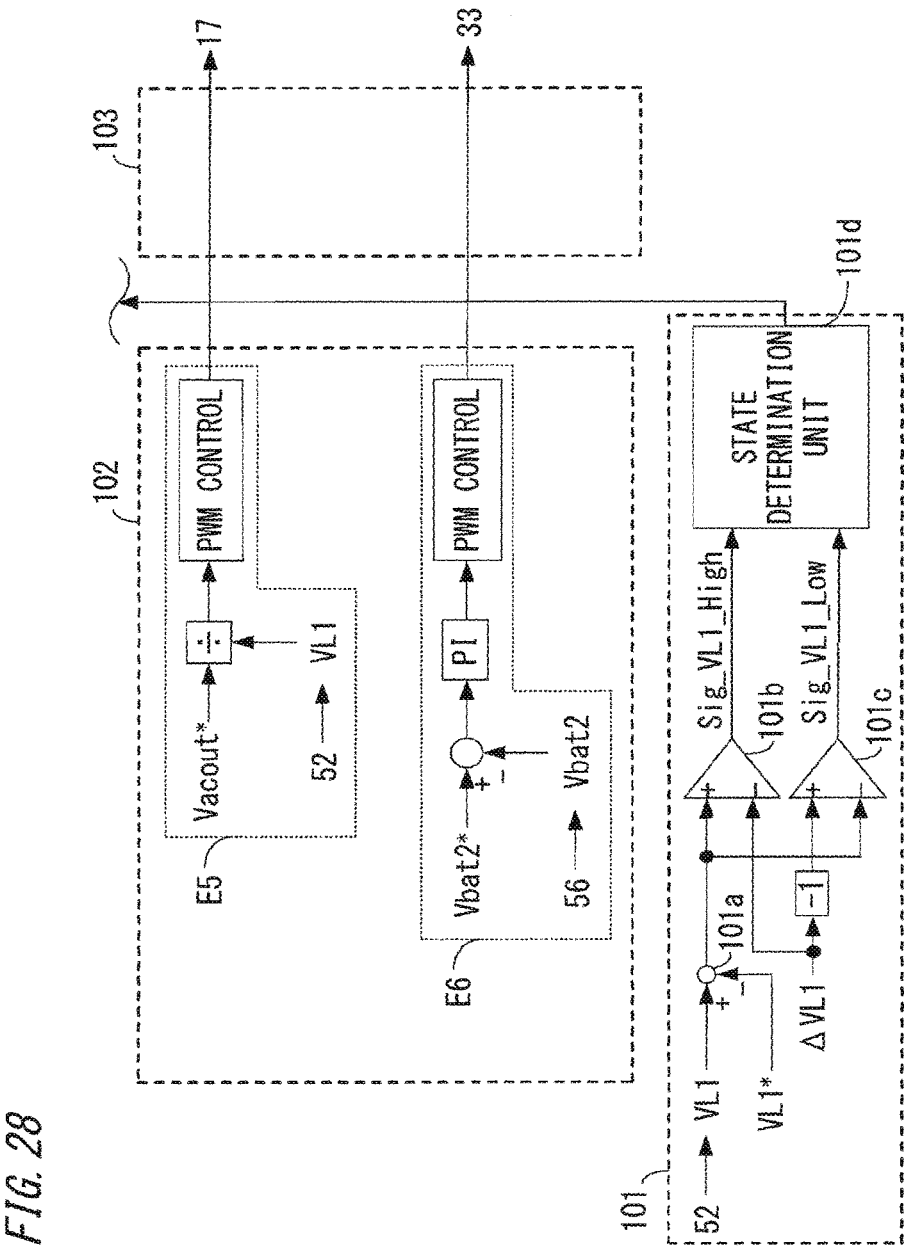
FIG. 28 is a block diagram showing the details of the configuration of the control unit shown in FIG. 26.

As a method for detecting excess/shortage of power during operation, a method of detecting the voltage VL1 of the capacitor 3 may be used. FIG. 27 and FIG. 28 show an example of the configuration diagram of the control unit 100 in the case where, for example, the operation state 2-A and the operation state 2-B are switched using the voltage VL1 of the capacitor 3.

First, control in the operation state 2-A will be described. As described above, the operation state 2-A corresponds to the case where the AC power supply 1 is connected and the AC power supply 1 is used as a power supply source, and input power P1_in from the AC power supply 1 is distributed into charge power P2_out for the first DC power supply, supply power P3_out for the AC load connected to the load device connection end 21, and charge power P4_out for the second DC power supply 34.

In FIG. 27 and FIG. 28, control blocks for the operation state 2-A are represented by, for example, control blocks E1 to E6 in the gate signal calculation circuit 102. The control by the control blocks E1 to E6 is a control example of performing such operation that supply power P3_out for the AC load connected to the load device connection end 21 and charge power P4_out for the second DC power supply 34 are prioritized, and the remaining power is supplied as charge power P2_out for the first DC power supply 11.

In this case, as shown in the control block E1 in FIG. 27, the AC/DC converter 2 supplies power with constant current. That is, for the AC/DC converter 2, a deviation between a current command value Iacin* for the AC power supply 1 and a current detection value Iacin from the voltage current detection unit 51 is subjected to proportional control (P control), and PWM control is performed, thereby supplying power to the capacitor 3 with constant current and at the same time, controlling AC current at a high power factor. At this time, the current command value Iacin* for the AC power supply 1 may be set arbitrarily.

As shown in the control block E2 in FIG. 27, for the first switching circuit 4, PWM operation is performed at a constant time ratio based on an arbitrary time ratio command value Duty*, thereby supplying AC power to the transformer 6.

As shown in the control block E3 in FIG. 27, for the second switching circuit 8, proportional integral control (PI control) is performed on the basis of a deviation between a voltage command value VL1* for the capacitor 3 and the voltage detection value VL1 from the voltage current detection unit 52, to obtain a current command value Ibat1* for the first DC power supply 11. A deviation between the current command value Ibat1* and the current detection value Ibat1 from the voltage current detection unit 53 is subjected to proportional control (P control), and PWM control is performed, thereby performing charge current control for the first DC power supply 11. At this time, as shown in the control block E4 in FIG. 27, the switch 9 is turned off, to cause the second switching circuit 8 to function as a full-bridge step-up chopper.

As shown in the control block E5 in FIG. 28, for the inverter 17, a quotient of a command value Vacout* for the output AC voltage and the voltage detection value VL1 from the voltage current detection unit 52 is used as a modulation rate for a sinewave inverter, and PWM control is performed, thereby outputting the AC voltage Vacout to the load device connection end 21.

As shown in the control block E6 in FIG. 28, for the switching element 33 composing the fourth switching circuit 30, proportional integral control (PI control) is performed on the basis of a deviation between a voltage command value Vbat2* for the second DC power supply 34 and the voltage detection value Vbat2 from the voltage current detection unit 56, and PWM control is performed, thereby performing charge voltage control for the second DC power supply 34.

As described above, in the case of operation state 2-A, the gate signals calculated in the control blocks E1 to E4 are inputted through the output switch units 103a to 103d to the AC/DC converter 2, the first switching circuit 4, the second switching circuit 8, and the switch 9, respectively. The gate signals calculated in the control blocks E5 and E6 are inputted to the inverter 17, and the switching element 33 of the fourth switching circuit 30, respectively.

Next, the operation state determination circuit 101 shown in FIG. 28 will be described. Here, the operation state determination circuit 101 is configured as a circuit for determining whether the voltage VL1 of the capacitor 3 increases or decreases.

That is, the subtractor 101a calculates a deviation between the voltage output value VL1 of the voltage current detection unit 52 and the voltage command value VL1* for the capacitor 3. A voltage variation upper limit value ΔVL1 is set arbitrarily, and a voltage variation lower limit value −ΔVL1 obtained by multiplying ΔVL1 by −1 is set. Then, the comparators 101b and 101c respectively compare the voltage variation upper limit value ΔVL1 and the voltage variation lower limit value −ΔVL1 with the deviation calculated by the subtractor 101a.

When the voltage output value VL1 of the capacitor 3 increases by ΔVL1 or more from the voltage command value VL1*, an increase determination signal Sig_VL1_High outputted from the comparator 101b becomes 1. Similarly, when the voltage output value VL1 of the capacitor 3 decreases by Δ VL1 or more from the voltage command value VL1*, a decrease determination signal Sig_VL1_Low outputted from the comparator 101c becomes 1. The state determination unit 101d detects rising of these determination signals, thereby generating an operation state determination signal.

The operation state determination signal from the state determination unit 101d is inputted to the output switch units 103a to 103d of the output switch circuit 103. In accordance with the operation state determination signal, the output switch units 103a to 103d switch the respective gate signals outputted from the gate signal calculation circuit 102.

For example, when operation is performed in the operation state 2-A, if the entire power outputted to the load device connection end 21, the first DC power supply 11, and the second DC power supply 34 as loads increases and input power from the AC power supply 1 becomes insufficient, the voltage output value VL1 of the capacitor 3 decreases. Then, when the voltage output value VL1 of the capacitor 3 decreases by ΔVL1 or more from the voltage command value VL1*, the decrease determination signal Sig_VL1_Low becomes 1. Rising of the determination signal is detected by the state determination unit 101d, and in response thereto, the state determination unit 101d outputs an operation state determination signal to the output switch unit 103a. The output switch unit 103a switches the gate signal calculated in the control block E1, to a gate signal of 0 of a control block F1, and outputs the gate signal of 0 to the AC/DC converter 2, whereby operation of the AC/DC converter 2 is stopped.

The output switch unit 103b switches, instead of the gate signal calculated in the control block E2, to a gate signal calculated in a control block F2, and outputs the same to the first switching circuit 4. In the control block F2, in order to control the voltage VL1 of the capacitor 3 to be constant, proportional integral control (PI control) is performed on the basis of a deviation between the voltage command value VL1* of the capacitor 3 and the voltage detection value VL1 of the voltage current detection unit 52, and a gate signal for PWM control is calculated.

The output switch unit 103c switches, instead of the gate signal calculated in the control block E3, to a gate signal calculated in a control block F3, and outputs the same to the second switching circuit 8. In the control block F3, in order to discharge the first DC power supply 11, a gate signal for performing PWM operation at a fixed time ratio based on an arbitrary time ratio command value Duty* is calculated. At this time, the output switch unit 103d switches the gate signal for the switch 9 from 0 to 1, to turn on the switch 9.

As a result, the power supply source is switched from the AC power supply 1 to the first DC power supply 11. That is, the operation state 2-A is switched to the operation state 2-B. At this time, components such as the inverter 17 and the fourth switching circuit 30, which continue to operate through the same control calculations (e.g., control blocks E5 and E6) irrespective of the operation state, are continuously operated without the gate signals therefor being switched.

As described above, in the case of the capacitor 3 used for smoothing output voltage of the AC/DC converter 2, when input power from the input side increases or output power supplied to the output side decreases, the capacitor voltage increases transiently. On the other hand, when input power from the input side decreases or output power supplied to the output side increases, the capacitor voltage decreases transiently. By detecting such a phenomenon by using the voltage detection value VL1 from the voltage current detection unit 52 for the capacitor 3, excess/shortage of input power relative to output power in the power conversion device in FIG. 15 and FIG. 16 is detected, whereby switching between the operation state 2-A and the operation state 2-B can be performed.

Thus, by using the method of detecting voltage of the capacitor 3, it becomes possible to switch the power supply source and continue the control operation, without individually detecting whether or not the AC power supply 1 is connected and whether power for the load devices increases or decreases.

Other than the above, as a method for detecting excess/shortage of power during operation, a method of detecting voltage and current of the AC power supply 1 may be used. That is, whether or not the input power P1_in from the AC power supply 1 is zero is detected using a result of detection by the voltage current detection unit 51 which detects voltage and current of the AC power supply 1, whereby whether or not the AC power supply 1 is connected is detected and thus switching between the operation state 2-A and the operation state 2-B can be performed.

Similarly, excess/shortage of power can be detected from detection values of voltages or currents of the first DC power supply 11 and the second DC power supply 34. For example, upper limit values are respectively set on charge currents and discharge currents for the first DC power supply 11 and the second DC power supply 34. Then, a state in which charging is performed with current equal to or greater than the upper limit value for the charge current is determined to be a state in which there is surplus power, and a state in which discharging is performed with current equal to or greater than the upper limit value for the discharge current is determined to be a state in which the power is insufficient. Thus, switching between the operation state 2-B and the operation state 2-C or switching between the operation state 2-C and the operation state 2-D can be performed.

In switching the operation state, instead of the method in which, as shown in FIG. 26 to FIG. 28, the gate signals for all the operation modes are calculated and necessary signals are outputted on the basis of the output signal from the operation state determination circuit 101, the output signal from the operation state determination circuit 101 may be inputted to the gate signal calculation circuit 102, and only the gate signals for the corresponding operation state may be calculated, whereby the operation state can be switched. By using this method, it becomes possible to perform control with the minimum necessary calculation amount in the case of performing calculation processing by a digital device such as a microcomputer.

In switching the operation state, by restricting supply of power to one of the loads that are the power reception parts other than a part serving as a power supply source so as to reduce the total power supplied to the loads, supply of power to a load having a high priority can be maximally continued.

A DC power supply that has plenty of charge amount may be determined from voltages or currents of the first DC power supply 11 and the second DC power supply 34, or the like, and power may be supplied from the DC power supply that has plenty of charge amount to the load devices. When power is being supplied to the load devices from the first DC power supply 11 or the second DC power supply 34, by switching to supply of power from the AC power supply 1, control of prioritizing supply of power from the AC power supply 1 over discharge from each DC power supply, can be achieved.

As described above, in the power conversion device of the present embodiment 2, when power supplied from the power supply is insufficient for the load power, power shortage is detected and the power supply can be switched to a power supply that is capable of supplying power.

Embodiment 3

Figure 29:
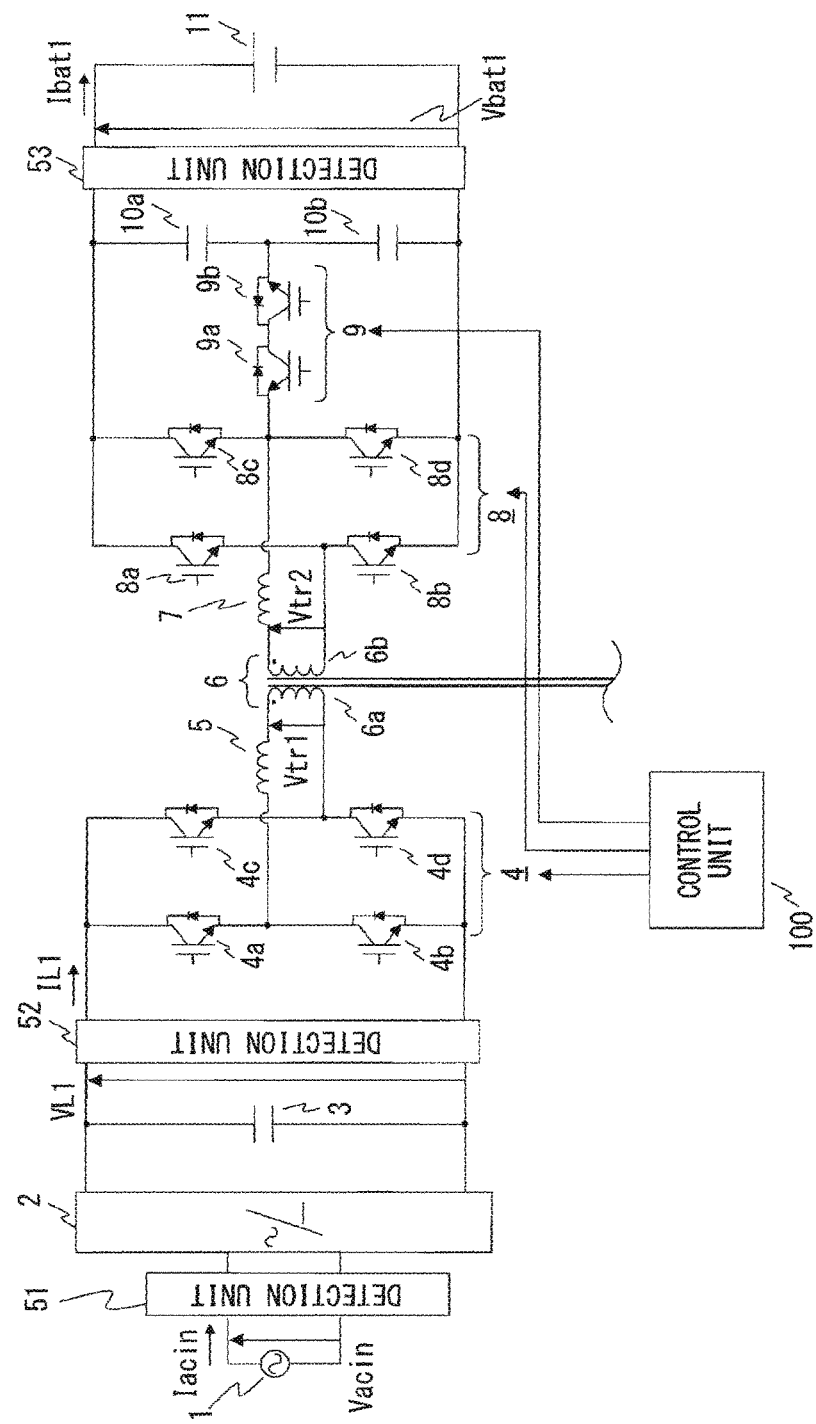
FIG. 29 is a circuit configuration diagram of a power conversion device according to embodiment 3 of the present invention.
Figure 30:
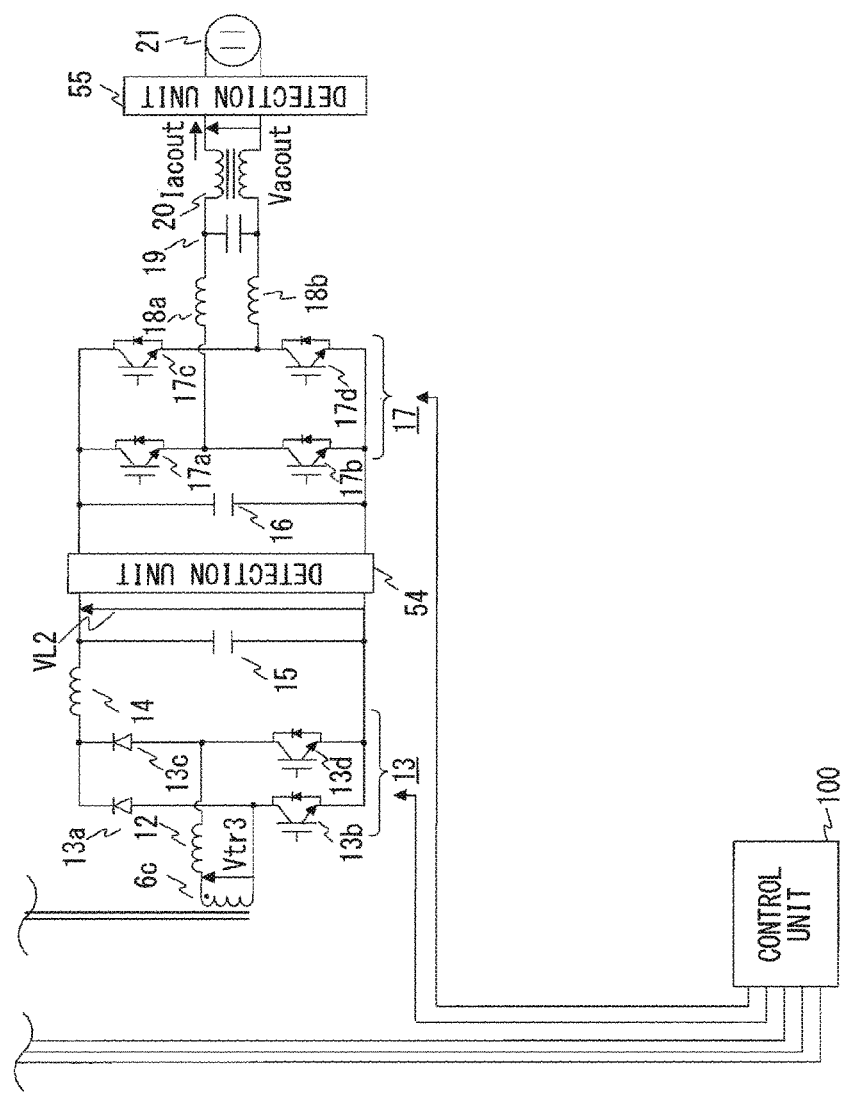
FIG. 30 is a circuit configuration diagram of the power conversion device according to embodiment 3 of the present invention.

FIG. 29 and FIG. 30 are circuit configuration diagrams of a power conversion device according to embodiment 3 of the present invention, and the components that correspond to or are the same as those in embodiment 1 shown in FIG. 1 are denoted by the same reference characters.

A feature in embodiment 3 is that the circuit including: the fourth windings 6d1 and 6d2 of the transformer 6; and the fourth switching circuit 30 and the second DC power supply 34 connected to the fourth windings 6d1 and 6d2, is eliminated from the configuration in embodiment 1 shown in FIG. 1 and FIG. 2. The other configuration is the same as in embodiment 1.

Therefore, except for the operation of the circuit including the fourth switching circuit 30 and the second DC power supply 34 in embodiment 1, the basic operation is the same as in embodiment 1, and therefore the detailed description thereof is omitted here.

In the power conversion device of the present embodiment 3, when power supplied from the power supply is insufficient for the load power, power shortage is detected and the power supply can be switched to a power supply that is capable of supplying power, whereby supply of power to the load can be continued.

Embodiment 4

Figure 31:
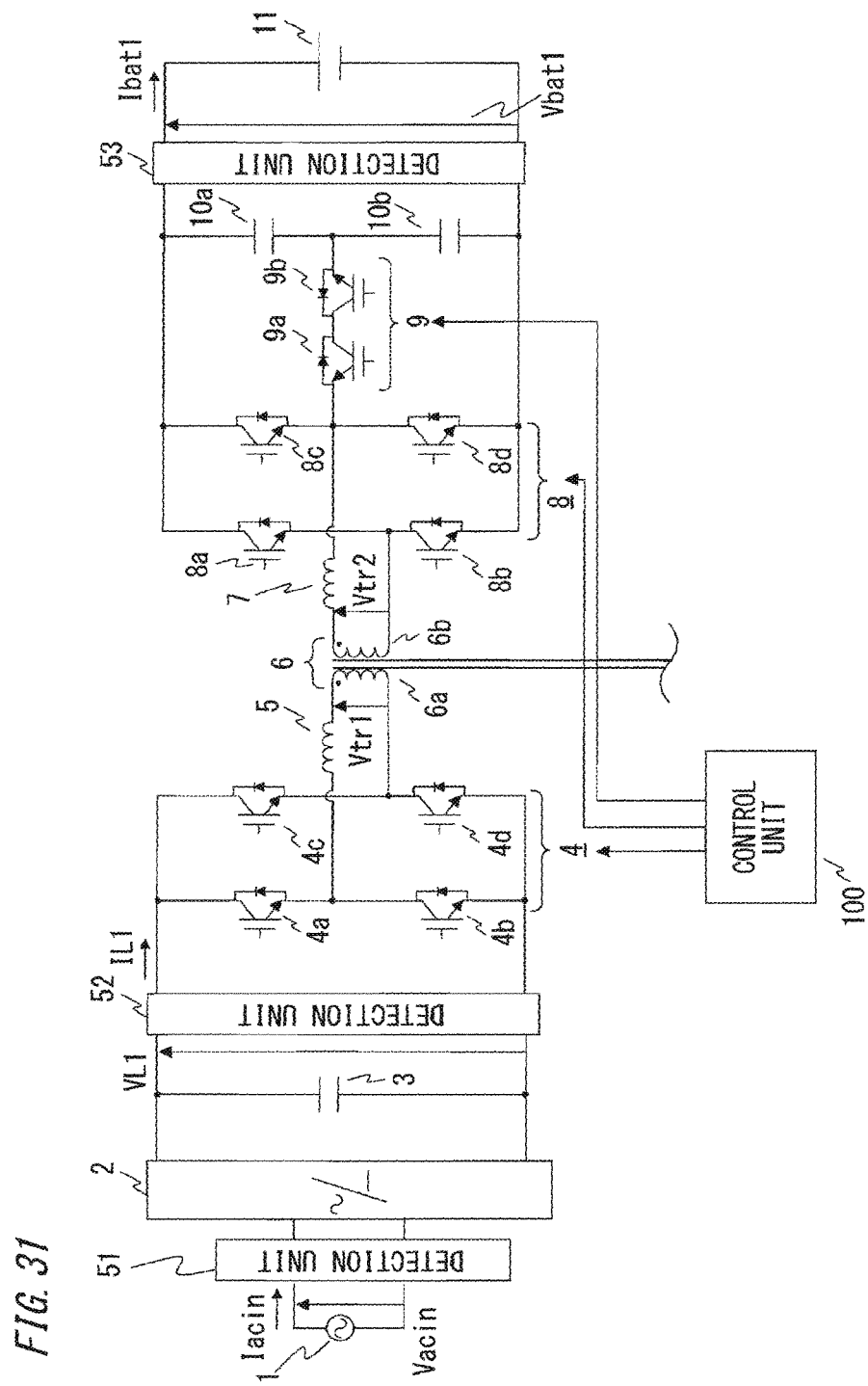
FIG. 31 is a circuit configuration diagram of a power conversion device according to embodiment 4 of the present invention.
Figure 32:
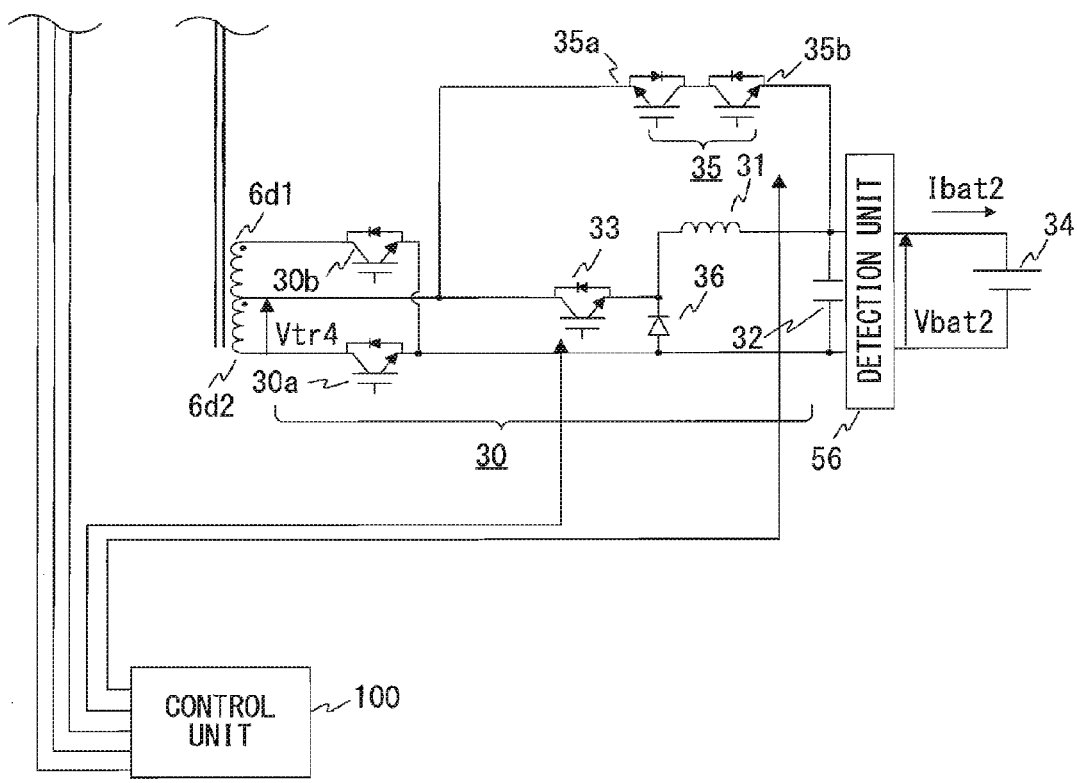
FIG. 32 is a circuit configuration diagram of the power conversion device according to embodiment 4 of the present invention.

FIG. 31 and FIG. 32 are circuit configuration diagrams of a power conversion device according to embodiment 4 of the present invention, and the components that correspond to or are the same as those in embodiment 1 shown in FIG. 1 are denoted by the same reference characters.

A feature in embodiment 4 is that the circuit including: the third winding 6c of the transformer 6; and the third switching circuit 13 and the inverter 17 connected to the third winding 6c, is eliminated from the configuration in embodiment 1 shown in FIG. 1 and FIG. 2. The other configuration is the same as in embodiment 1.

Therefore, except for the operation of the circuit including the third switching circuit 13 and the inverter 17 in embodiment 1, the basic operation is the same as in embodiment 1, and therefore the detailed description thereof is omitted here.

In the power conversion device of the present embodiment 4, when power supplied from the power supply is insufficient for the load power, power shortage is detected and the power supply can be switched to a power supply that is capable of supplying power, whereby supply of power to the load can be continued.

The present invention is not limited only to the configurations shown in the above embodiments 1 to 4. Without deviating from the gist of the present invention, the configurations in embodiments 1 to 4 may be combined as appropriate, or each configuration may be partially modified or omitted.

The invention claimed is:

1. A power conversion device connected to an AC power supply and a DC power supply, the power conversion device comprising:
   a transformer having three or more windings magnetically coupled with each other;
   an AC/DC converter for converting power outputted from the AC power supply to DC;
   a capacitor for smoothing the power DC-converted by the AC/DC converter;
   a first switching circuit for converting the power smoothed by the capacitor to AC and outputting the resultant power to one of the three or more windings;
   a switching circuit which is connected to at least one of the others of the three or more windings and converts power inputted to the DC power supply or power outputted from the DC power supply;
   a voltage detection unit for detecting voltage of the capacitor; and
   a power supply switch unit for switching a power supply source between the AC power supply and the DC power supply on the basis of a detection value from the voltage detection unit.

2. A power conversion device connected to an AC power supply and a DC power supply, the power conversion device comprising:
   a transformer having three or more windings magnetically coupled with each other;
   an AC/DC converter for converting power outputted from the AC power supply to DC;
   a capacitor for smoothing the power DC-converted by the AC/DC converter;
   a first switching circuit for converting the power smoothed by the capacitor to AC and outputting the resultant power to one of the three or more windings;
   a switching circuit which is connected to at least one of the others of the three or more windings and converts power inputted to the DC power supply or power outputted from the DC power supply;
   a voltage detection unit for detecting voltage of the AC power supply; and
   a power supply switch unit for switching a power supply source between the AC power supply and the DC power supply on the basis of a detection value from the voltage detection unit.

3. The power conversion device according to claim 1, wherein
   the windings composing the transformer include a first winding, a second winding, a third winding, and a fourth winding,
   the DC power supply includes a first DC power supply and a second DC power supply, and
   the first switching circuit is connected to the first winding, the power conversion device further comprising:
   a second switching circuit which is connected to the second winding and converts power inputted to the first DC power supply or power outputted from the first DC power supply;
   a third switching circuit which is connected to the third winding and rectifies voltage of the third winding;
   an inverter which converts the voltage rectified by the third switching circuit to AC and outputs the resultant voltage to an AC load; and
   a fourth switching circuit which is connected to the fourth winding and converts power inputted to the second DC power supply or power outputted from the second DC power supply, wherein
   the power supply switch unit performs switching of the power supply source among the AC power supply, the first DC power supply, and the second DC power supply.

4. The power conversion device according to claim 1, wherein
   the windings composing the transformer include a first winding, a second winding, and a fourth winding,
   the DC power supply includes a first DC power supply and a second DC power supply, and
   the first switching circuit is connected to the first winding, the power conversion device further comprising:
   a second switching circuit which is connected to the second winding and converts power inputted to the first DC power supply or power outputted from the first DC power supply;
   a fourth switching circuit which is connected to the fourth winding and converts power inputted to the second DC power supply or power outputted from the second DC power supply; and
   an inverter which is connected to an output side of the AC/DC converter in parallel with the first switching circuit, converts DC voltage of the capacitor to AC, and outputs the resultant voltage to an AC load, wherein
   the power supply switch unit performs switching of the power supply source among the AC power supply, the first DC power supply, and the second DC power supply.

5. The power conversion device according to claim 1, wherein
   the windings composing the transformer include a first winding, a second winding, and a third winding,
   the DC power supply includes a first DC power supply, and
   the first switching circuit is connected to the first winding, the power conversion device further comprising:
   a second switching circuit which is connected to the second winding and converts power inputted to the first DC power supply or power outputted from the first DC power supply;
   a third switching circuit which is connected to the third winding and rectifies voltage of the third winding;
   an inverter which converts the voltage rectified by the third switching circuit to AC and outputs the resultant voltage to an AC load, wherein
   the power supply switch unit performs switching of the power supply source between the AC power supply and the first DC power supply.

6. The power conversion device according to claim 1, wherein
   the windings composing the transformer include a first winding, a second winding, and a fourth winding,
   the DC power supply includes a first DC power supply and a second DC power supply, and
   the first switching circuit is connected to the first winding, the power conversion device further comprising:
   a second switching circuit which is connected to the second winding and converts power inputted to the first DC power supply or power outputted from the first DC power supply; and a fourth switching circuit which is connected to the fourth winding and converts power inputted to the second DC power supply or power outputted from the second DC power supply, wherein the power supply switch unit performs switching of the power supply source among the AC power supply, the first DC power supply, and the second DC power supply.

7. The power conversion device according to claim 3, further comprising:
   a detection unit for detecting states of charge of the first DC power supply and the second DC power supply; and
   a control unit for performing control of preferentially discharging one of the first DC power supply and the second DC power supply on the basis of a result of detection by the detection unit.

8. The power conversion device according to claim 1, wherein
   in switching of the power supply source, power supplied to one of loads for the power supply sources is restricted.

9. The power conversion device according to claim 2, wherein
   the windings composing the transformer include a first winding, a second winding, a third winding, and a fourth winding,
   the DC power supply includes a first DC power supply and a second DC power supply, and
   the first switching circuit is connected to the first winding, the power conversion device further comprising:
   a second switching circuit which is connected to the second winding and converts power inputted to the first DC power supply or power outputted from the first DC power supply;
   a third switching circuit which is connected to the third winding and rectifies voltage of the third winding;
   an inverter which converts the voltage rectified by the third switching circuit to AC and outputs the resultant voltage to an AC load; and
   a fourth switching circuit which is connected to the fourth winding and converts power inputted to the second DC power supply or power outputted from the second DC power supply, wherein
   the power supply switch unit performs switching of the power supply source among the AC power supply, the first DC power supply, and the second DC power supply.

10. The power conversion device according to claim 2, wherein
    the windings composing the transformer include a first winding, a second winding, and a fourth winding,
    the DC power supply includes a first DC power supply and a second DC power supply, and
    the first switching circuit is connected to the first winding, the power conversion device further comprising:
    a second switching circuit which is connected to the second winding and converts power inputted to the first DC power supply or power outputted from the first DC power supply;
    a fourth switching circuit which is connected to the fourth winding and converts power inputted to the second DC power supply or power outputted from the second DC power supply; and
    an inverter which is connected to an output side of the AC/DC converter in parallel with the first switching circuit, converts DC voltage of the capacitor to AC, and outputs the resultant voltage to an AC load, wherein
    the power supply switch unit performs switching of the power supply source among the AC power supply, the first DC power supply, and the second DC power supply.

11. The power conversion device according to claim 2, wherein
    the windings composing the transformer include a first winding, a second winding, and a third winding,
    the DC power supply includes a first DC power supply, and
    the first switching circuit is connected to the first winding, the power conversion device further comprising:
    a second switching circuit which is connected to the second winding and converts power inputted to the first DC power supply or power outputted from the first DC power supply;
    a third switching circuit which is connected to the third winding and rectifies voltage of the third winding;
    an inverter which converts the voltage rectified by the third switching circuit to AC and outputs the resultant voltage to an AC load, wherein
    the power supply switch unit performs switching of the power supply source between the AC power supply and the first DC power supply.

12. The power conversion device according to claim 2, wherein
    the windings composing the transformer include a first winding, a second winding, and a fourth winding,
    the DC power supply includes a first DC power supply and a second DC power supply, and
    the first switching circuit is connected to the first winding, the power conversion device further comprising:
    a second switching circuit which is connected to the second winding and converts power inputted to the first DC power supply or power outputted from the first DC power supply; and
    a fourth switching circuit which is connected to the fourth winding and converts power inputted to the second DC power supply or power outputted from the second DC power supply, wherein
    the power supply switch unit performs switching of the power supply source among the AC power supply, the first DC power supply, and the second DC power supply.

13. The power conversion device according to claim 4, further comprising:
    a detection unit for detecting states of charge of the first DC power supply and the second DC power supply; and
    a control unit for performing control of preferentially discharging one of the first DC power supply and the second DC power supply on the basis of a result of detection by the detection unit.

14. The power conversion device according to claim 6, further comprising:
    a detection unit for detecting states of charge of the first DC power supply and the second DC power supply; and
    a control unit for performing control of preferentially discharging one of the first DC power supply and the second DC power supply on the basis of a result of detection by the detection unit.

15. The power conversion device according to claim 9, further comprising:

a detection unit for detecting states of charge of the first DC power supply and the second DC power supply; and a control unit for performing control of preferentially discharging one of the first DC power supply and the second DC power supply on the basis of a result of detection by the detection unit.

16. The power conversion device according to claim 10, further comprising:

a detection unit for detecting states of charge of the first DC power supply and the second DC power supply; and a control unit for performing control of preferentially discharging one of the first DC power supply and the second DC power supply on the basis of a result of detection by the detection unit.

17. The power conversion device according to claim 12, further comprising:

a detection unit for detecting states of charge of the first DC power supply and the second DC power supply; and a control unit for performing control of preferentially discharging one of the first DC power supply and the second DC power supply on the basis of a result of detection by the detection unit.

18. The power conversion device according to claim 2, wherein in switching of the power supply source, power supplied to one of loads for the power supply sources is restricted.

* * * * *